(12) United States Patent
Hirano

(10) Patent No.: US 7,345,438 B2
(45) Date of Patent: Mar. 18, 2008

(54) ELECTROMAGNETIC DRIVER

(76) Inventor: Mutsuo Hirano, 840-23, Angyoutouhachi, Kawaguchi-shi, Saitama 334-0051 (JP)

( * ) Notice: Subject to any disclaimer, the term of this patent is extended or adjusted under 35 U.S.C. 154(b) by 0 days.

(21) Appl. No.: 11/549,157

(22) Filed: Oct. 13, 2006

(65) Prior Publication Data

US 2007/0096855 A1 May 3, 2007

(30) Foreign Application Priority Data

Oct. 13, 2005 (JP) .............................. 2005-326692

(51) Int. Cl.
*H02P 1/00* (2006.01)
(52) U.S. Cl. .................. 318/119; 318/121; 310/21; 310/27
(58) Field of Classification Search ........... 318/119, 318/121, 254; 310/21, 26, 27
See application file for complete search history.

(56) References Cited

U.S. PATENT DOCUMENTS 4,990,805 A * 2/1991 Zieve ....................... 310/27
5,025,183 A * 6/1991 Fuschetto ................. 310/20
5,367,277 A * 11/1994 Kaidou .................... 335/229
6,874,750 B2 * 4/2005 Muraji .................. 251/129.04

FOREIGN PATENT DOCUMENTS

JP  2-79699  6/1990

\* cited by examiner

*Primary Examiner*—Rina Duda
(74) *Attorney, Agent, or Firm*—Lowe Hauptman Ham & Berner LLP

(57) ABSTRACT

In an electromagnetic driver according to the invention, electromagnetic units are arranged in the axial direction of a shaft, and a power supply change-over device is so formed that, when an attractive magnetic field arises between the coil unit and the magnetic unit of the one of the electromagnetic units, a repulsive magnetic field is generated between the coil unit and the magnet unit of the other of the electromagnetic units. As the polarity is alternately changed over by the power supply change-over device when a direct current is supplied to the exciting coils of the electromagnetic units, the coil unit or the magnetic unit reciprocates, and further the shaft reciprocates in the axial direction.

9 Claims, 19 Drawing Sheets

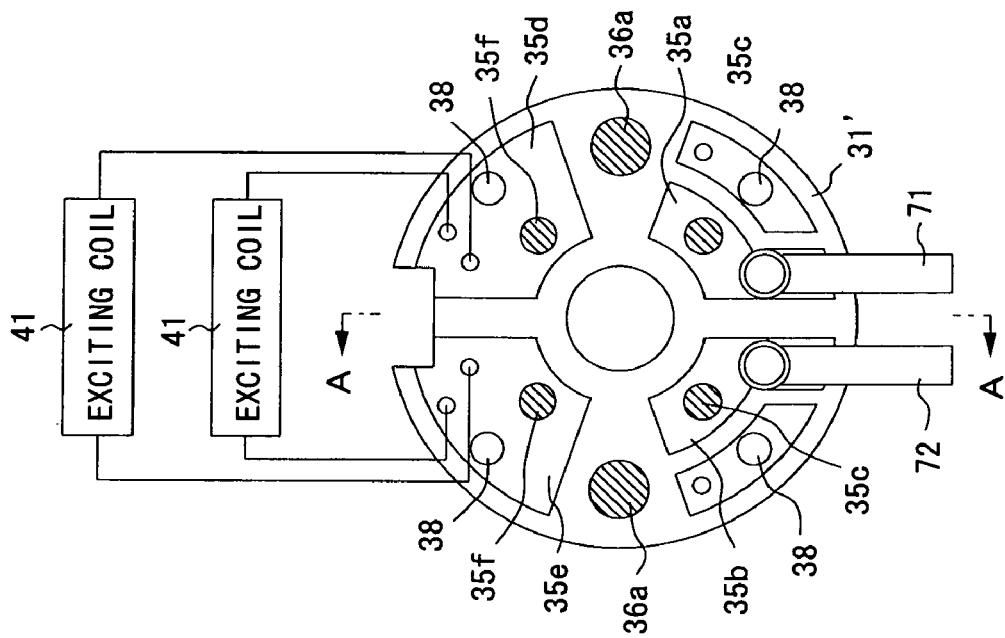
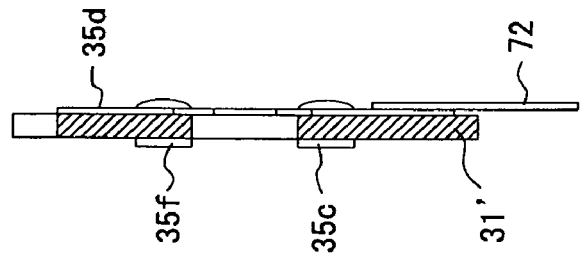
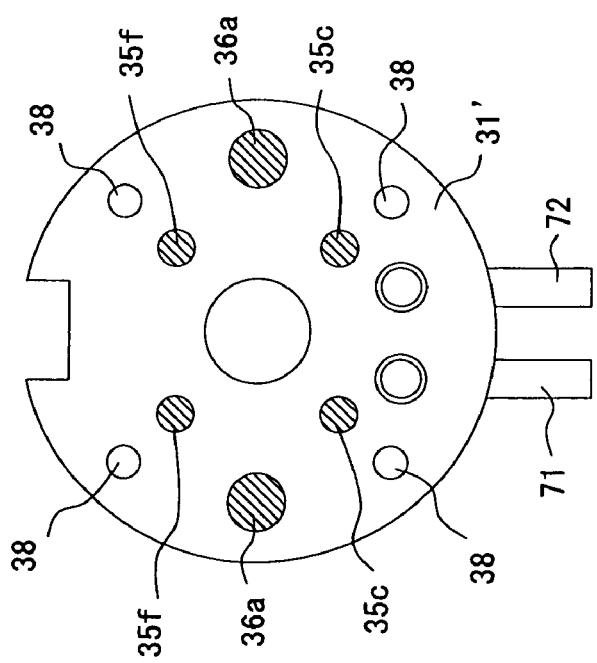

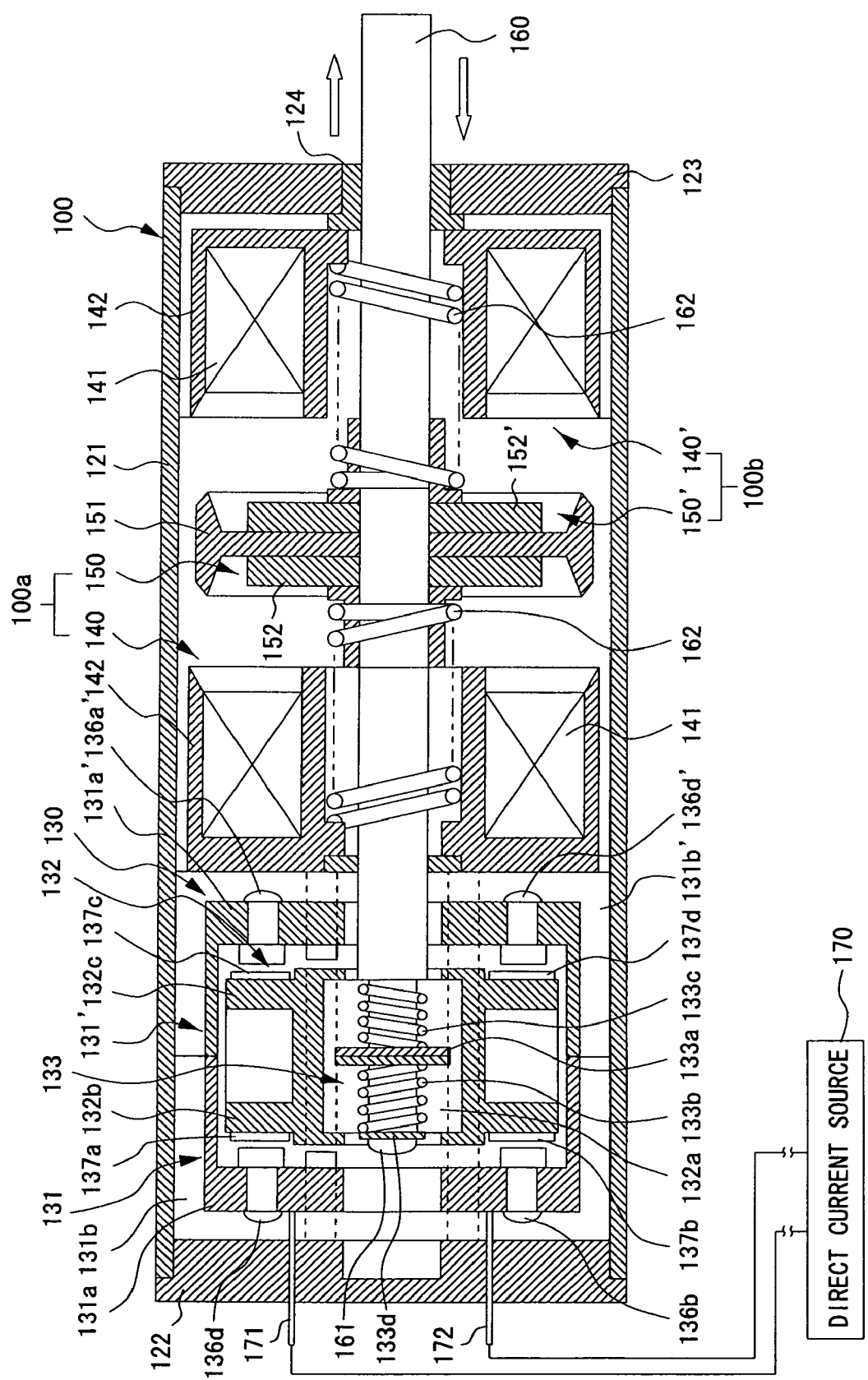

F I G. 1 5 (a)
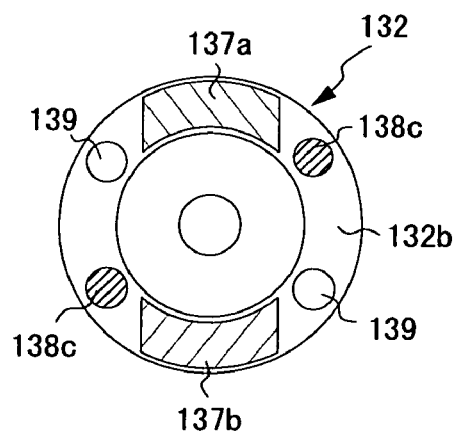
F I G. 1 5 (b)
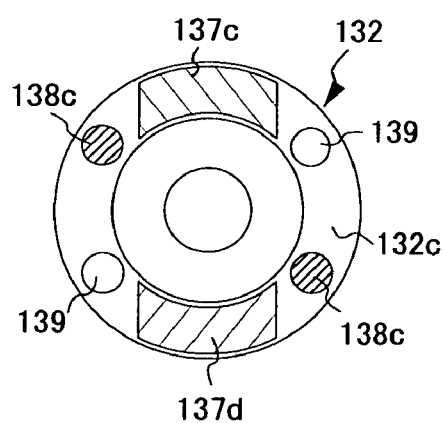
F I G. 1 6 (a)
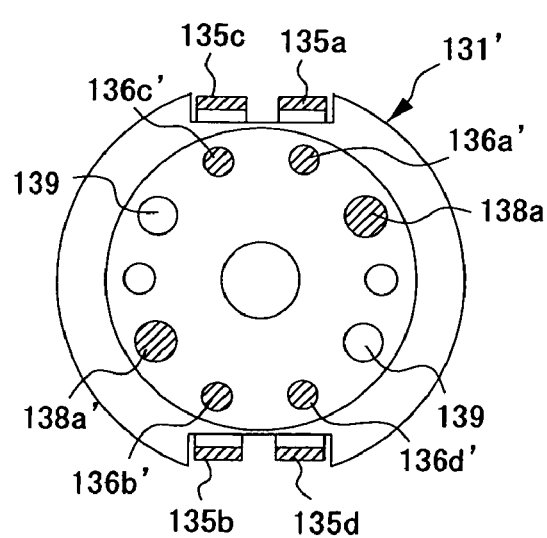
F I G. 1 6 (b)
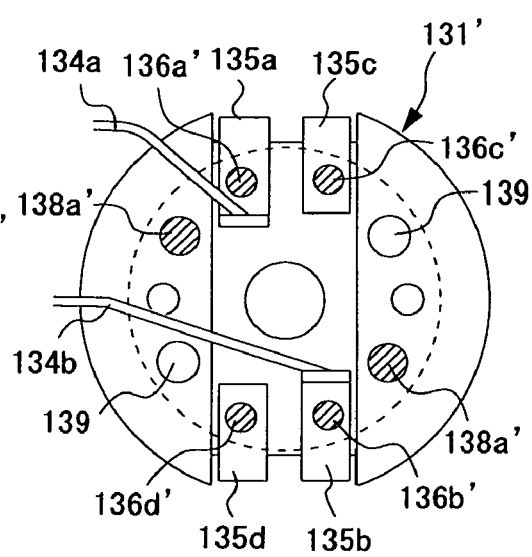

F I G. 2 1 (a)
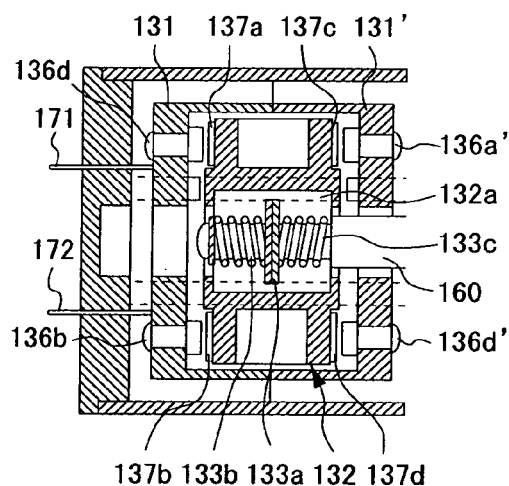
F I G. 2 1 (b)
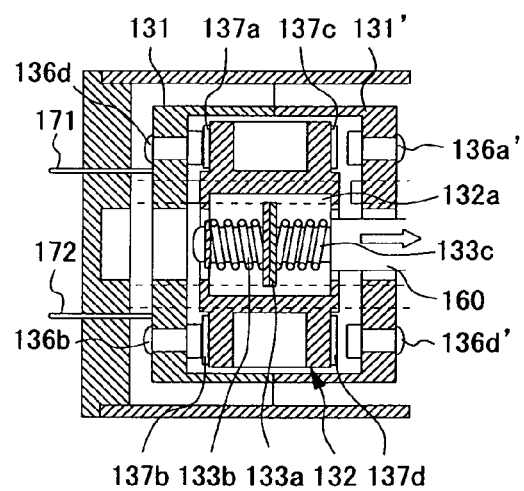
F I G. 2 1 (c)
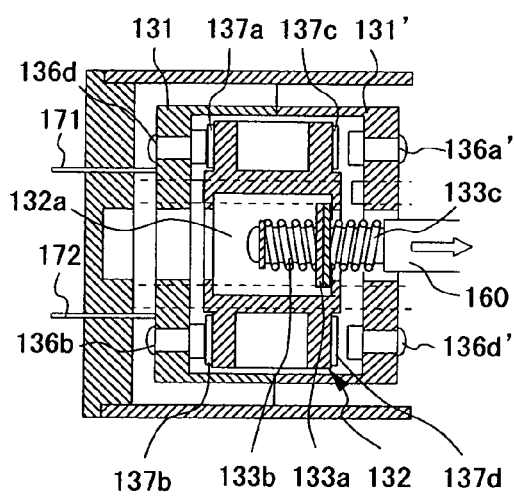
F I G. 2 1 (d)
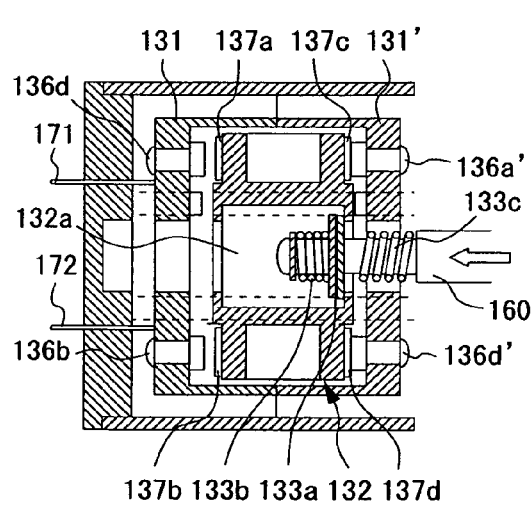

ELECTROMAGNETIC DRIVER

BACKGROUND OF THE INVENTION

1. Field of the Invention

The present invention relates to an electromagnetic driver which reciprocates its shaft in an axial direction.

2. Description of the Related Art

Conventionally known apparatuses which reciprocate their respective shafts in the axial direction include what converts the rotational motion supplied from a rotary motor into a linear motion by using a cam mechanism or the like. However, the cam mechanism is structurally unsuitable for high speed operation.

On the other hand, reciprocating devices each having a coil housing for holding an exciting coil, a permanent magnet arranged opposite the exciting coil and a flat spring supporting the coil housing so as to permit oscillation are extensively known (e.g. Japanese Utility Model Publication No. 2-79699). However, an oscillation (reciprocation) is possible when an alternating current is supplied to the exciting coil, but not when a direct current is supplied.

BRIEF SUMMARY OF THE INVENTION

An object of the present invention is to provide, in view of the problems with the related art noted above, an electromagnetic driver which reciprocates its shaft by supplying a direct current to an electromagnetic unit.

An electromagnetic driver according to the invention has a structure provided with two electromagnetic units each having a coil unit which induces in one direction magnetic fluxes formed by supplying a direct current to an exciting coil with a yoke core and a magnet unit in which a permanent magnet is so arranged as to interfere with the magnetic field of the coil unit, wherein either the coil unit or the magnet unit is made movable by the supply of the direct current to the exciting coil; a shaft which is capable of reciprocating in the axial direction, having the electromagnetic units arranged in the axial direction, and is firmly stuck to the movable coil unit or the magnet unit; and a power supply change-over device which, when a direct current is to be supplied to the exciting coil, is capable of so changing over alternately the current polarity of the exciting coil that, when an attracting magnetic field is formed between the coil unit and the magnet unit of one of the electromagnetic units, a repulsive magnetic field is formed between the coil unit and the magnet unit of the other of the electromagnetic units and, when an attracting magnetic field is formed between the coil unit and the magnet unit of the other of the electromagnetic units, a repulsive magnetic field is formed between the coil unit and the magnet unit of the one of the electromagnetic units.

According to the invention, as the polarity can be alternately changed over by the power supply change-over device when a direct current is to be supplied to the exciting coil of the electromagnetic unit, the coil unit or the magnet unit reciprocates and furthermore the shaft reciprocates in the axial direction.

BRIEF DESCRIPTION OF SEVERAL VIEWS OF THE DRAWINGS

FIG. 7(a) shows the rear surface of the wiring board for the second electrode pertaining to the first embodiment of the invention;

FIG. 7(b) shows a section of the wiring board for the second electrode pertaining to the first embodiment of the invention in the direction of arrow A-A;

FIG. 7(c) shows the front surface of the wiring board for the second electrode pertaining to the first embodiment of the invention;

FIG. 15(a) shows the front surface of the slide member pertaining to the third embodiment of the invention;

FIG. 15(b) shows the rear surface of the slide member pertaining to the third embodiment of the invention;

FIG. 16(a) shows the rear surface of the wiring member for the second electrode pertaining to the third embodiment of the invention;

FIG. 16(b) shows the front surface of the wiring member for the second electrode pertaining to the third embodiment of the invention;

DETAILED DESCRIPTION OF THE INVENTION

Figure 1:
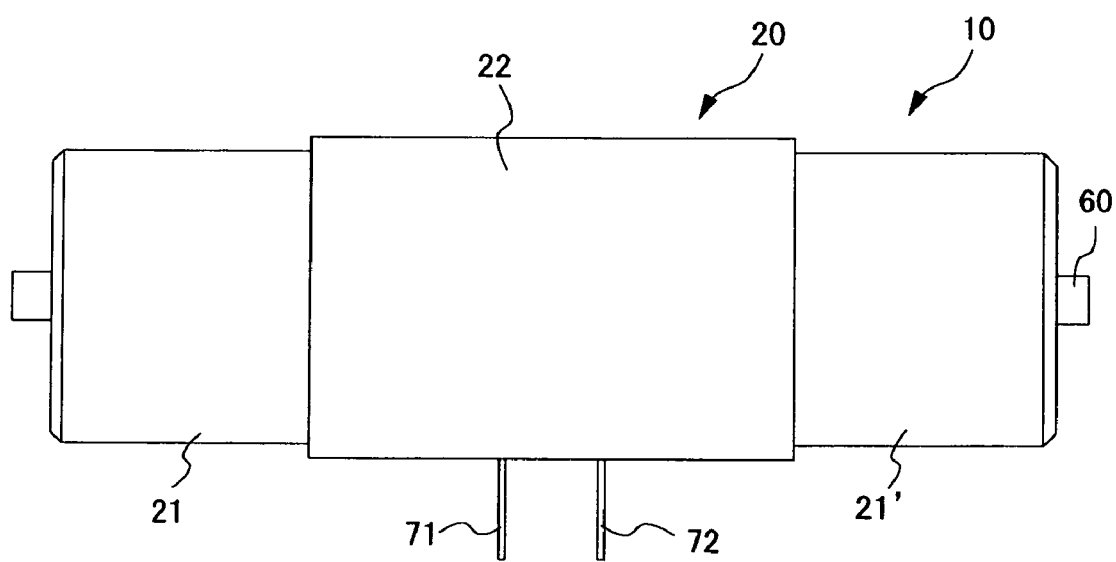
FIG. 1 shows a front view of an electromagnetic driver, which is a first preferred embodiment of the present invention.

FIG. 1 through FIGS. 8(a), 8(b), 8(c), 8(d), 8(e) and 8(f) illustrate an electromagnetic driver, which is a first preferred embodiment of the present invention.

An electromagnetic driver 10, which is the first embodiment of the invention, has a laterally long cylindrical casing 20, a power supply change-over device 30 installed at the center in the lengthwise direction of the casing 20, first and second coil units 40 and 40' arranged on the left and right outsides of the power supply change-over device 30, first and second magnet units 50 and 50' arranged on the left and right outsides of the first and second coil units 40 and 40', and a shaft 60 penetrating the center of the casing 20 left to right. The first coil unit 40 and the first magnet unit 50 constitute a first electromagnetic unit 10a, and the second coil unit 40' and the second magnet unit 50' constitute a second electromagnetic unit 10b.

The casing 20 has first and second casing bodies 21 and 21' and a linking case 22 connecting the casing bodies 21 and 21'. The open sides of the casing bodies 21 and 21' are abutted against each other, and the magnet units 50 and 50' are accommodated inside the casing bodies 21 and 21'. The first and second coil units 40 and 40' and the power supply change-over device 30 are arranged in the abutted part of each casing body 21, and these units are covered by the linking case 22 from outside the casing bodies 21 and 21'.

Figure 3:
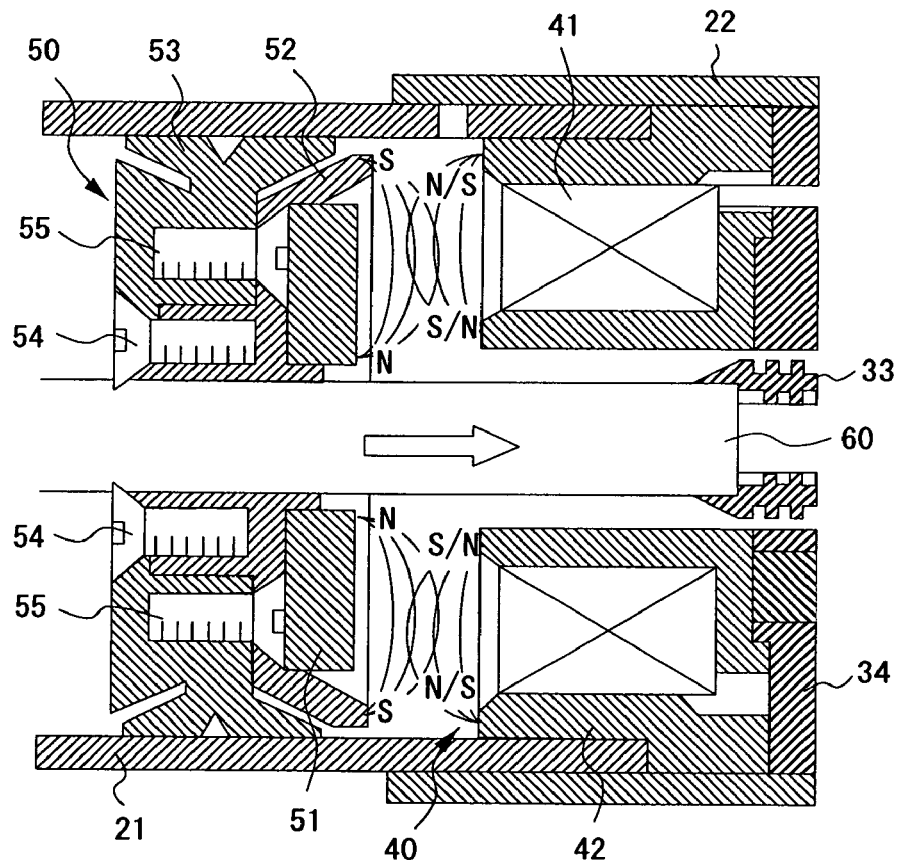
FIG. 3 is an enlarged sectional view showing magnetic interference between a coil unit and a permanent magnet pertaining to the first embodiment of the invention.

As the first and second coil units 40 and 40' are formed in the same structure, the following description will focus on the first coil unit 40 with reference to FIG. 3 and cover the second coil unit 40' as well. The first coil unit 40 has an annular yoke core 42 around which an exciting coil 41 is wound. This yoke core 42 opens toward the first magnet unit 50. As a result, a magnetic flux that is generated when power is supplied to the exciting coil 41 is formed toward the first magnet unit 50. Obviously, the magnetic flux of the second coil unit 40', like that of the first coil unit 40, is formed toward the second magnet unit 50'.

As the first and second magnet units 50 and 50' are formed in a common structure, the following description will focus on first magnet unit 50 with reference to FIG. 3 and cover the second magnet unit 50' as well. The first magnet unit 50 comprises an annular permanent magnet 51, a disk-shaped magnet yoke 52 to which the permanent magnet 51 is fixed and an annular bearing 53 supporting the shaft 60. The permanent magnet 51 has its face opposing the first coil unit 40 as the N pole and the face reverse thereto as the S pole. The magnet yoke 52 fixes the S pole side of the permanent magnet 51, and at the same time induces this pole toward outside the N pole of the permanent magnet 51. As a result, the magnetic field of the permanent magnet 51 efficiently interferes with the magnetic flux of the first coil unit 40. The bearing 53 is linked to the rear face of the magnet yoke 52 with screws 54 and 55 and fixed to the shaft 60. The bearing 53 is formed of an elastic resin. The outer circumferential face of the bearing 53 tightly sticks to the inner face of the casing body 21 with the result that the shaft 60 is slidably supported by the casing body 21 via the bearing 53.

The first magnet unit 50 and the second magnet unit 50' are so structured as to differ in the polarity of the permanent magnet 51. Thus the permanent magnet 51 of the first magnet unit 50 has its face opposing the first coil unit 40 as the N pole and the face reverse thereto as the S pole as stated above. On the other hand, the permanent magnet 51 of the second magnet unit 50' has its face opposing the second coil unit 40' as the S pole and the face reverse thereto as the N pole. This arrangement makes the magnetic field of the second magnet unit 50' repulsive when that of the first magnet unit 50 becomes attractive while making the magnetic field of the second magnet unit 50' attractive when that of the first magnet unit 50 becomes repulsive. As a result, when the polarities of the direct current in the coil units 40 and 40' are alternately changed, the shaft 60 reciprocates in the axial direction.

The power supply change-over device 30 has first and second electrode wiring boards 31 and 31', a slide plate 32, and first and second change-over engaging members 33 and 33'. Herein, the first and second electrode wiring boards 31 and 31' are symmetrically arranged with respect to the slide plate 32 between them, and have the same structure. The first change-over engaging member 33 and the second change-over engaging member 33' also have the same structure. Therefore, the following description of the first electrode wiring board 31 will also apply to the second electrode wiring board 31', and so will the description of the first change-over engaging member 33 to the second change-over engaging member 33'.

Figure 2:
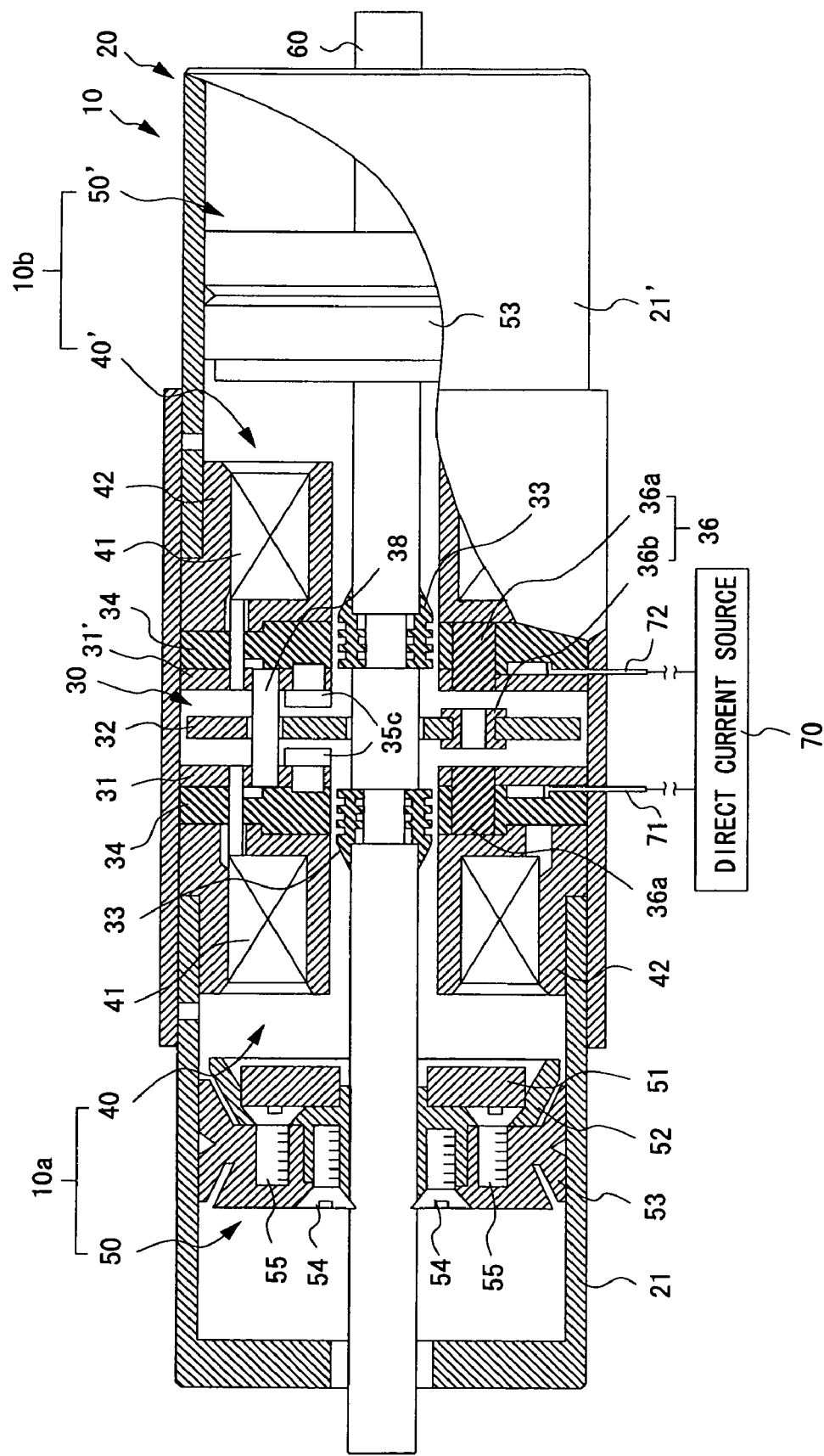
FIG. 2 shows a partially cut sectional view of the electromagnetic driver, which is the first preferred embodiment of the invention.
Figure 5:
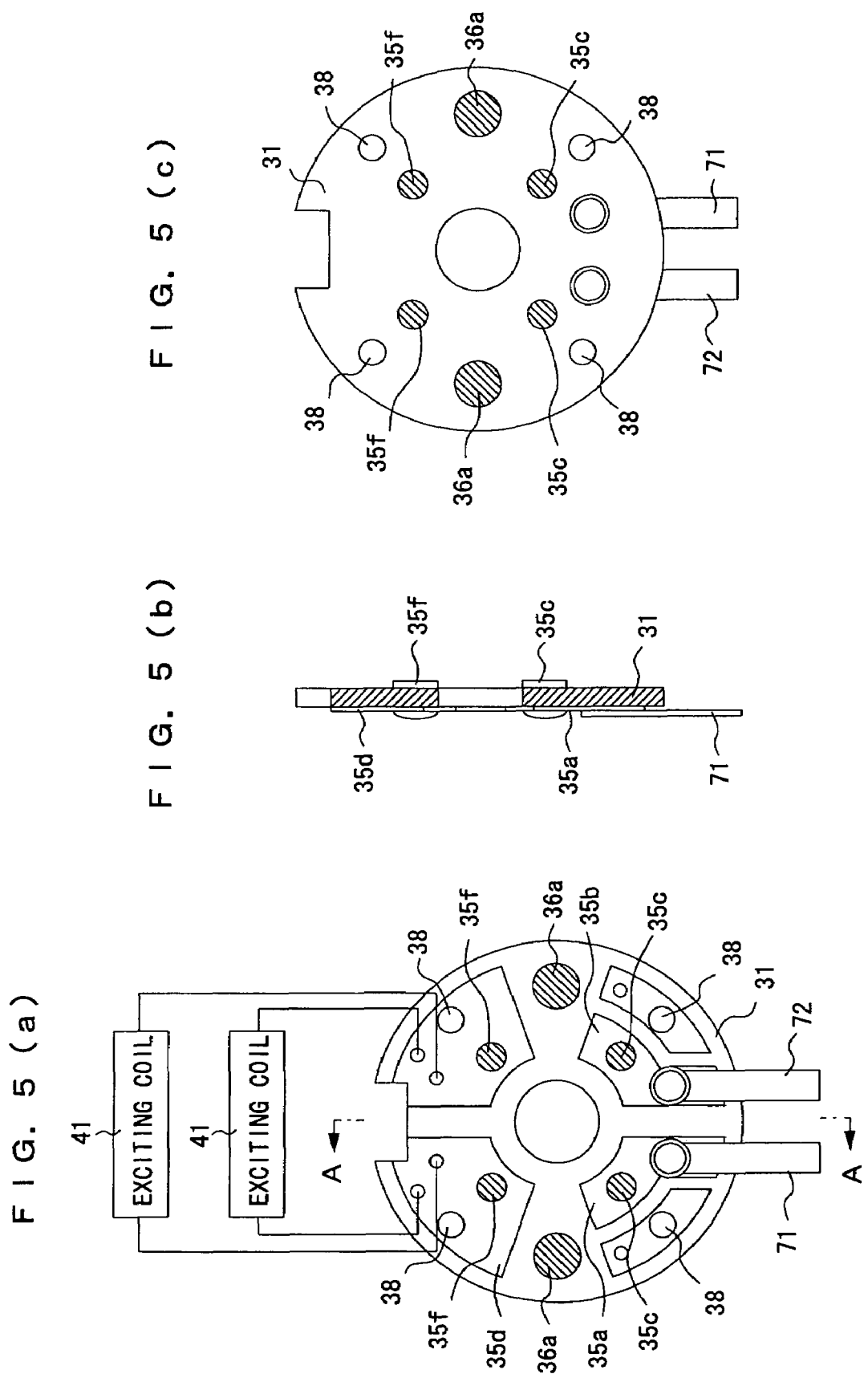
FIG. 5(a) shows the front surface of the wiring board for the first electrode pertaining to the first embodiment of the invention.
FIG. 5(b) shows a section of the wiring board for the first electrode pertaining to the first embodiment of the invention in the direction of arrow A-A.
FIG. 5(c) shows the rear surface of the wiring board for the first electrode pertaining to the first embodiment of the invention.

The first electrode wiring board 31 is formed in a disk shape as shown in FIG. 5. The first electrode wiring board 31 is arranged via an insulating board 34 vis-à-vis the first coil unit 40 as shown in FIG. 2.

Figure 4:
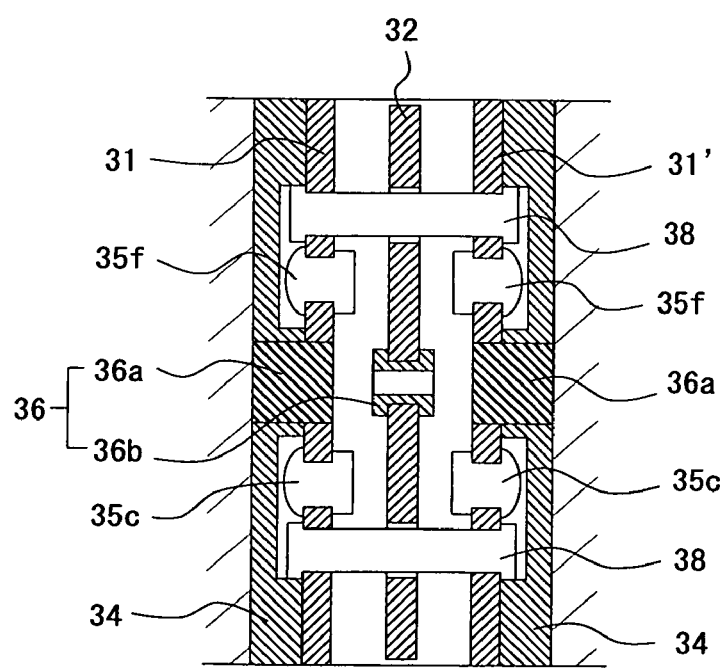
FIG. 4 is a sectional view showing the positional relationship among wiring boards for first and second electrodes and a slide plate pertaining to the first embodiment of the invention.

The first electrode wiring board 31 has a first power supply electrode 35. The first power supply electrode 35 has a positive-negative pair of power supply side electrode plates 35a and 35b to link it to a direct current source 70 via lead terminals 71 and 72. The electrode plates 35a and 35b are arranged on the surface (the face toward the insulating board 34 of the first electrode wiring board 31, and fixed to the first electrode wiring board 31 with electroconductive rivets 35c penetrating the first electrode wiring board 31. Also, the first power supply electrode 35 has on its surface exciting coil side electrode plates 35d and 35e, isolated from the electrode plates 35a and 35b. The electrode plates 35d and 35e are fixed to the first electrode wiring board 31 with electroconductive rivets 35f penetrating the first electrode wiring board 31. Also, two attractive magnets 36a are embedded in the first electrode wiring board 31 as shown in FIG. 4. The second electrode wiring board 31' is configured in the same structure as the first electrode wiring board 31 so far described. FIG. 7 shows the second electrode wiring board 31', wherein constituent elements common with the first electrode wiring board 31 are designated by respectively the same reference signs, and their description is dispensed with. Incidentally, the electric polarity of the second power supply electrode 35' of the second electrode wiring board 31' is reverse to the electric polarity of the first power supply electrode 35 of the first electrode wiring board 31. As a result, the polarity of the magnetic field differs with whether power is supplied to the exciting coil 41 via the first power supply electrode 35 or it is supplied to via the second power supply electrode 35'.

Figure 6:
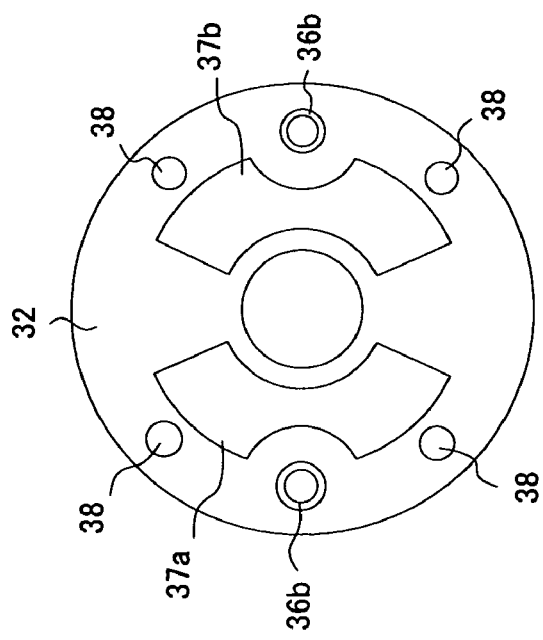
FIG. 6(a) shows the front surface of the slide plate pertaining to the first embodiment of the invention.
FIG. 6(b) shows a section of the slide plate pertaining to the first embodiment of the invention in the direction of arrow B-B.
FIG. 6(c) shows the rear surface of the slide plate pertaining to the first embodiment of the invention.
Figure 6:
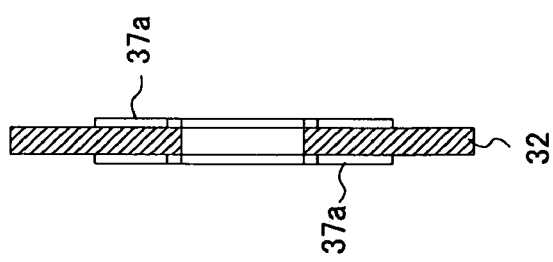
Figure 6:
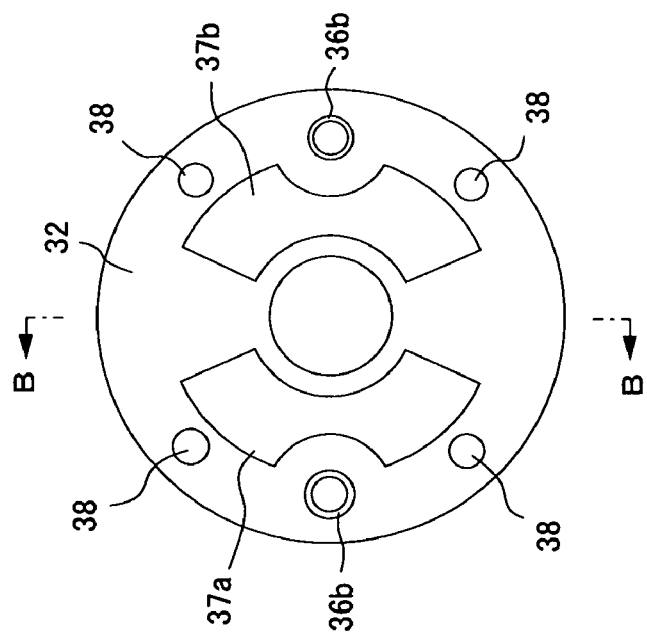

The slide plate 32 is formed in a disk shape as shown in FIG. 6. It is arranged between the first and second electrode wiring boards 31 and 31' with some spacing from them. Two change-over electrode plates 37a and 37b opposite the electroconductive rivets 35c and 35f of the first and second electrode wiring boards 31 and 31' are firmly stuck to the both faces of the slide plate 32. Here, when the slide plate 32 shifts toward the first electrode wiring board 31, the change-over electrode plates 37a and 37b are connected to the electroconductive rivets 35c and 35f of the first power supply electrode 35. On the other hand, when the slide plate 32 shifts toward the second electrode wiring board 31', the change-over electrode plates 37a and 37b are connected to the electroconductive rivets 35c and 35f of the second power supply electrode 35'.

Also, magnetic rivets 36b are so embedded in the slide plate 32 as to oppose the attractive magnets 36a. The magnetic rivets 36b are attracted by the attractive magnets 36a of the first and second electrode wiring boards 31 and 31'. These attractive magnets 36a and magnetic rivets 36b constitute a magnet attracting member 36.

Further, electroconductive slide pins 38 penetrate the slide plate 32 as shown in FIG. 4. The two ends of each slide pin 38 are firmly stuck to the first and second electrode wiring boards 31 and 31'. This enables the slide plate 32 to be supported by the slide pins 38 and to move between the electrode wiring boards 31 and 31'.

The first change-over engaging member 33 firmly stuck to the shaft 60, shifts in the axial direction also with the shifting of the shaft 60 in the same axial direction. The first change-over engaging member 33 is formed of an elastic member made of resin. When the first change-over engaging member 33 shifts toward the slide plate 32, the first change-over engaging member 33 is engaged with the inner circumferential edge of the slide plate 32 to cause the shifting force of the shaft 60 to be provided to the slide plate 32 via the first change-over engaging member 33. A second change-over engaging member 33' is formed in a similar structure to the first change-over engaging member 33 configured as described above, and the change-over engaging members 33 and 33' are so arranged as to oppose each other the slide plate 32 between them.

Figure 8:
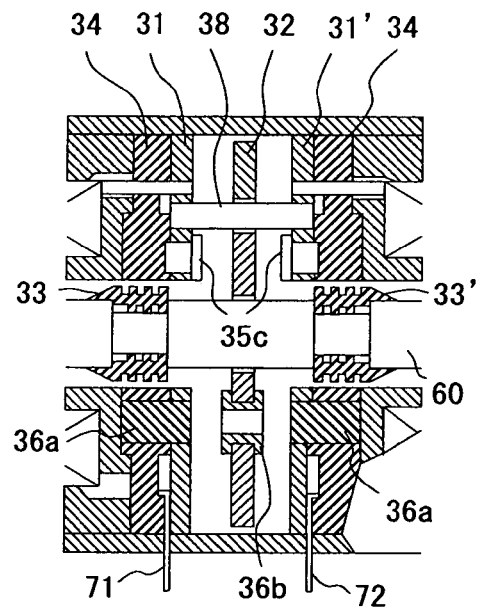
FIG. 8(a) shows the standby state of the slide plate pertaining to the first embodiment of the invention.
FIG. 8(b) is an attraction process diagram showing the state in which the slide plate pertaining to the first embodiment of the invention is attracted to the wiring board for the first electrode.
FIG. 8(c) is an engagement process diagram showing the state in which a first change-over engaging member is engaged with the slide plate pertaining to the first embodiment of the invention.
FIG. 8(d) is an attraction process diagram showing the state in which the slide plate pertaining to the first embodiment of the invention is attracted to the wiring board for the second electrode.
FIG. 8(e) is an engagement process diagram showing the state in which a second change-over engaging member is engaged with the slide plate pertaining to the first embodiment of the invention.
FIG. 8(f) is an attraction process diagram showing the state in which the slide plate pertaining to the first embodiment of the invention is attracted again to the wiring board for the first electrode.
Figure 8:
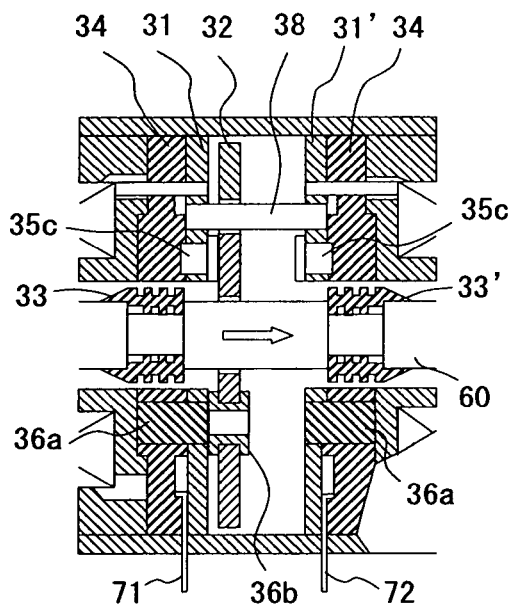
Figure 8:
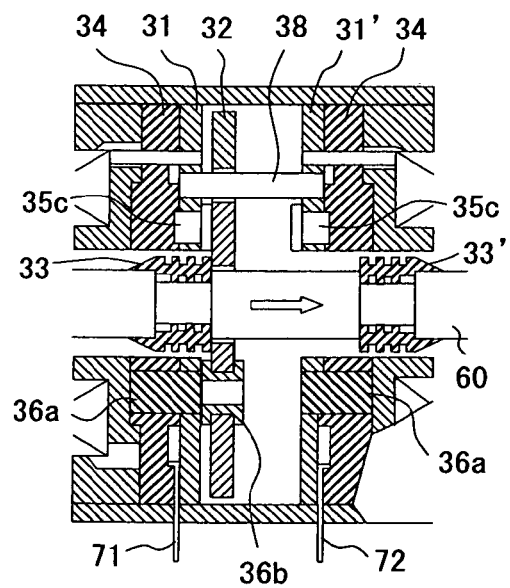
Figure 8:
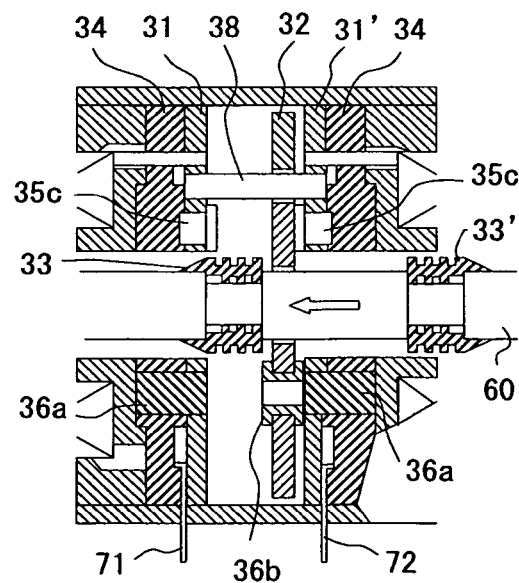

The operations of the electromagnetic driver 10 of this embodiment the invention will now be described with reference to FIG. 8. FIG. 8(a) shows its standby state, wherein the slide plate 32 is positioned between the electrode wiring boards 31 and 31'. However, as the slide plate 32 usually is not supposed to be positioned between the electrode wiring boards 31 and 31', the slide plate 32 is attracted by either the electrode wiring board 31 or 31' as shown in FIG. 8(b) (wherein the slide plate 32 is shown attracted by the first electrode wiring board 31).

When power is supplied from the direct current source 70 to the lead terminals 71 and 72 in this state, the current flows to the exciting coils 41 in a sequence of the electrode plates 35a and 35b of the electrode wiring board 31→the electroconductive rivets 35c→the change-over electrode plates 37a and 37b opposed to the first electrode wiring plate 31→the electroconductive rivets 35f→the electrode plates 35d and 35e. On the other hand, since the second electrode wiring board 31' and the slide plate 32 are not attracted to each other, no power is supplied to the exciting coils 41 from the second electrode wiring board 31' side.

This causes a repulsive magnetic field to be formed between the first magnet unit 50 and the first coil unit 40 and at the same time an attractive magnetic field to be formed between the second magnet unit 50' and the second coil unit 40'. As a result, the shaft 60 shifts in the direction indicated by the arrow in white in FIG. 8(b).

This shifting of the shaft 60 causes the first change-over engaging member 33 to come into contact with the inner circumferential edge of the slide plate 32 as shown in FIG. 8(c), and a shifting force to move away from the first electrode wiring board 31 to work on the slide plate 32. This causes the slide plate 32 to move away from the first electrode wiring board 31 toward the second electrode wiring board 31', and is attracted by the second electrode wiring board 31' as shown in FIG. 8(d).

This causes the current so far flowing to the exciting coils 41 via the first electrode wiring board 31 to flow to the exciting coils 41 via the second electrode wiring board 31'. As a result, a current different in polarity flows in each of the exiting coils 41. This reversal of the polarity causes an attractive magnetic field to be formed between the first magnet unit 50 and the first coil unit 40 and at the same time a repulsive magnetic field to be formed between the second magnet unit 50' and the second coil unit 40'. As a result, the shaft 60 shifts in the direction indicated by the arrow in white in FIG. 8(d).

Figure 8E:
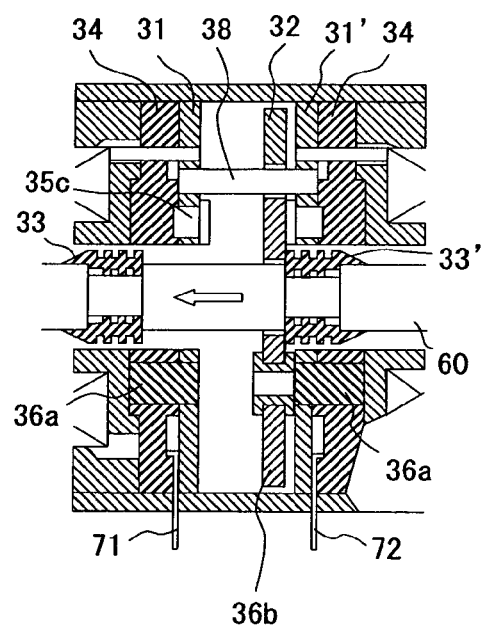
Figure 8F:
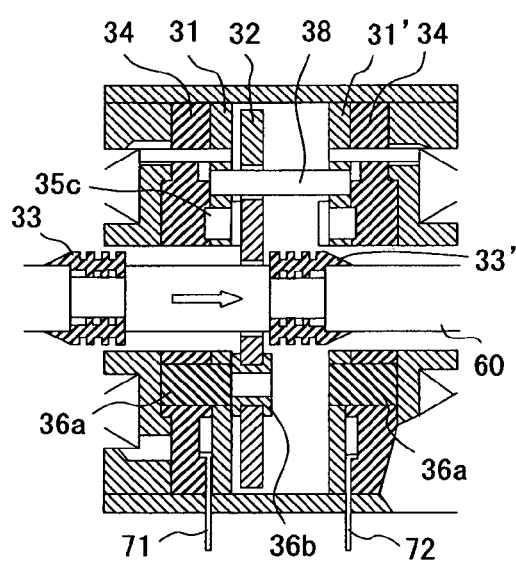

This shifting of the shaft 60 causes the second change-over engaging member 33' to come into contact with the inner circumferential edge of the slide plate 32 as shown in FIG. 8(e), and a shifting force to move away from the second electrode wiring board 31' to work on the slide plate 32. This causes the slide plate 32 to move away from the second electrode wiring board 31' toward the first electrode wiring board 31, and is attracted by the first electrode wiring board 31 as shown in FIG. 8(f). After that, the state shown in FIG. 8(b) is resumed.

In this embodiment of the invention, when a direct current is supplied to the exciting coils 41 of the electromagnetic units 10a and 10b, since the polarity is alternately changed over by the power supply change-over device 30, the first and second magnet units 50 and 50' reciprocate, and further the shaft 60 reciprocates in the axial direction.

Figure 9:
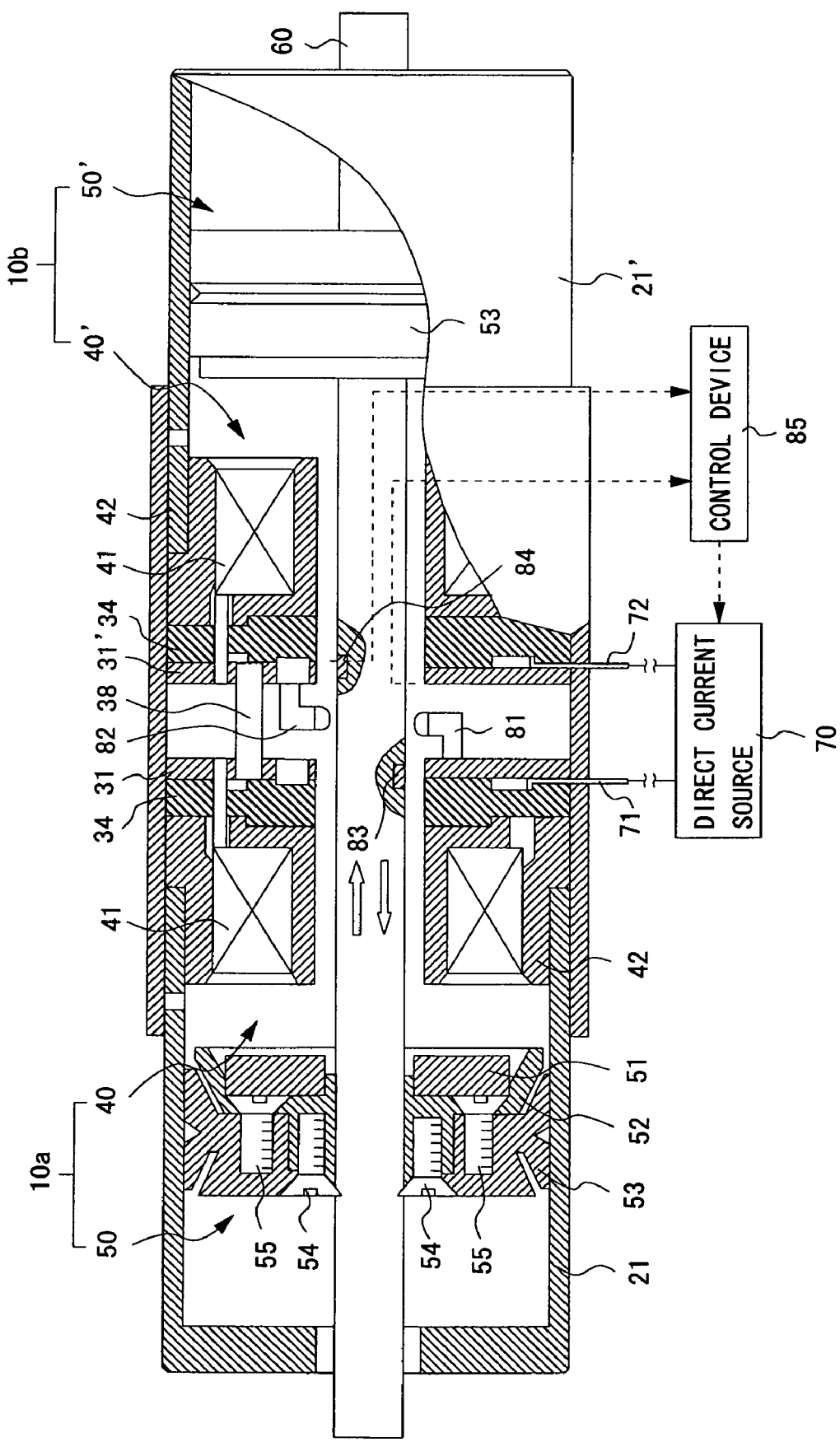
FIG. 9 shows a partially cut sectional view of the electromagnetic driver, which is a second preferred embodiment of the invention.
Figure 10:
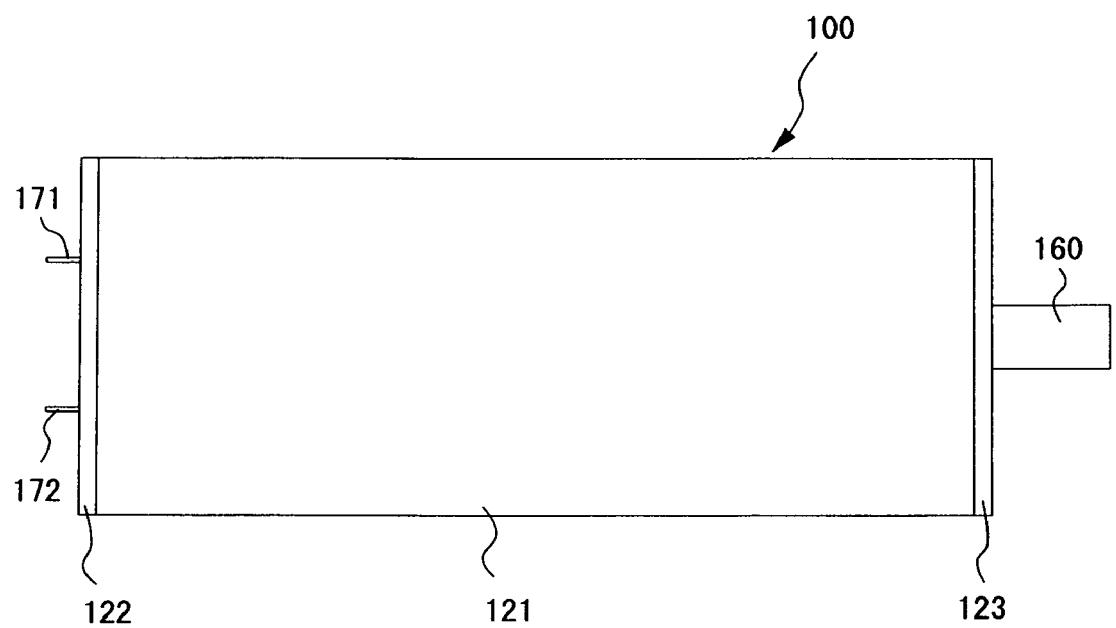
FIG. 10 shows a front view of an electromagnetic driver, which is a third preferred embodiment of the invention.

FIG. 9 shows another electromagnetic driver, which is a second embodiment of the invention. Constituent elements common with the first embodiment are designated by respectively the same reference signs, and their description is dispensed with.

While the polarity of the direct current supplied to the exciting coils 41 is changed by the slide plate and the magnet attractive member in the foregoing embodiment, the polarity of the direct current is changed by two magnet sensors 81 and 82, magnets 83 and 84 and a control device 85 in this preferred embodiment.

Thus, the magnet sensors 81 and 82 are arranged with the shaft 60 between them. The magnets 83 and 84 are embedded in the shaft 60, and arranged with spacing in the axial direction of the shaft 60. The control device 85 selectively controls power supply to the lead terminals 71 and 72 in accordance with detection signals from the magnet sensors 81 and 82.

In this embodiment, when power is supplied to the exciting coils 41 via the first electrode wiring board 31, the shaft 60 shifts in one axial direction (rightward in FIG. 9). Then, if the magnet sensor 81 detects the magnet 83, power supply from the first electrode wiring board 31 stops, and power is supplied to the exciting coil 41 via the second electrode wiring board 31'. This causes the shaft 60 to shift in the other axial direction (leftward in FIG. 9). After that, if the magnet sensor 82 detects the magnet 84, power supply from the second electrode wiring board 31' stops, and power is supplied to the exciting coil 41 via the first electrode wiring board 31. This causes the shaft 60 to shift again in the previous axial direction.

In this way, the shaft 60 also reciprocates in the axial direction in this electromagnetic driver of the second embodiment.

FIG. 10 through FIG. 21 shows still another electromagnetic driver, which is a third embodiment of the invention. An electromagnetic driver 100, which is the third embodiment, has a laterally long cylindrical casing 120, a power supply change-over device 130 arranged toward one end in the lengthwise direction of the casing 120, first and second coil units 140 and 140' arranged toward the other end in the lengthwise direction from substantially center of the casing 120, first and second magnet units 150 and 150' arranged between the first and second coil units 140 and 140', and a shaft 160 penetrating the center of the casing 120. The first coil unit 140 and the first magnet unit 150 constitute a first electromagnetic unit 100a, and the second coil unit 140' and the second magnet unit 150' constitute a second electromagnetic unit 100b.

The casing 120 has a laterally long cylindrical casing body 121 and lids 122 and 123 blocking the left and right openings of the casing body 121. One lid 122 is penetrated, as shown in FIG. 12(a), by a positive-negative pair of lead terminals 171 and 172 to be described afterwards. The other lid 123 is penetrated, as shown in FIG. 12(b), by the tip part of the shaft 160 via a bearing 124.

Since the first and second coil unit 140 and 140' are configured in the same structure, the first coil unit 140 will be described with reference to FIG. 11(a), and this description will also apply to the second coil unit 140'. The first coil unit 140 has an annular yoke core 142 to accommodate the exciting coil 141 which is wound in an annular shape. This yoke core 142 is firmly stuck to the casing body 121. Also, the yoke core 142 opens toward the first magnet unit 150. As a result, the magnetic flux generated when power is supplied to the exciting coil 141 is formed toward the first magnet unit 150. Obviously, the second coil unit 140', like the first coil unit 140, is so configured as to cause the magnetic flux to be formed toward the second magnet unit 150'.

The first and second magnet units 150 and 150' comprises a disk-shaped magnet yoke 151 and permanent magnets 152 and 152' fixed to the left and right faces of the magnet yoke 151. The permanent magnet 152 opposes the first coil unit 140, while the permanent magnet 152' opposes the second coil unit 150'. The magnet units 150 and 150' are firmly stuck to the shaft 160 and, when the magnet units 150 and 150' reciprocate in the axial direction, the shaft 160 also reciprocates.

As shown in FIG. 11(b), those side faces of the permanent magnets 152 and 152' that oppose the coil units 140 and 140' are supposed to be the N poles and the reverse faces, the S poles. On the other hand, the first coil unit 140 and the second coil unit 140' are so formed as to have mutually different polarities when a direct current is supplied to the coil units 140 and 140'. This configuration makes the magnetic field of the second magnet unit 150' repulsive when that of the first magnet unit 150 becomes attractive while making the magnetic field of the second magnet unit 150' attractive when that of the first magnet unit 150 becomes repulsive. As a result, when the polarities of the direct current in the coil units 140 and 140' are alternately changed, the shaft 160 reciprocates in the axial direction. Incidentally, as the magnet yoke 151 induces the S pole side of the permanent magnet 152 toward outside the N pole side of the permanent magnet 152, the magnetic field of the permanent magnet 152 efficiently interferes with the magnetic fluxes of the coil units 140 and 140'. A damping spring 162 wound around the shaft 160 is provided between the coil units 140 and 140' and the magnet units 150 and 150'.

The power supply change-over device 130, as shown in FIG. 11(a), has first and second electrode wiring members 131 and 131', a slide member 132 and a change-over engaging member 133, and the shaft 160 penetrates the members 131, 131', 132 and 133.

Both of the first and second electrode wiring members 131 and 131' have cylindrical wiring member bodies 131a and 131a', of each of which one end is opened and the other is blocked. Further, as shown in FIG. 12, the openings of the wiring member bodies 131a and 131a' are opposed and brought into contact with each other to form a space inside, and the slide member 132 is accommodated by this space.

Figure 11:
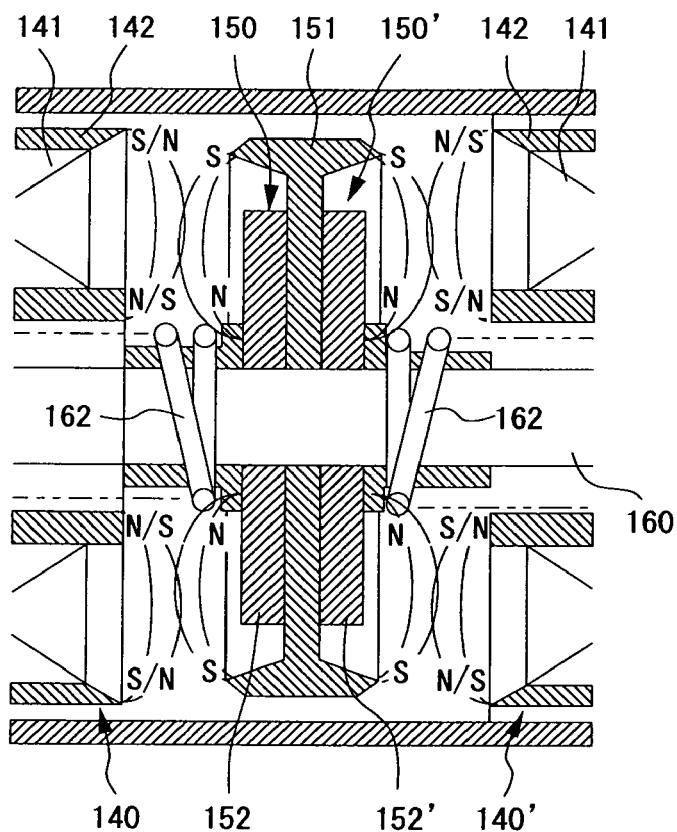
FIG. 11(a) shows a section of the electromagnetic driver, which is the third preferred embodiment of the invention.
FIG. 11(b) is an enlarged sectional view showing magnetic interference between a coil unit and a permanent magnet pertaining to the third embodiment of the invention.
Figure 12:
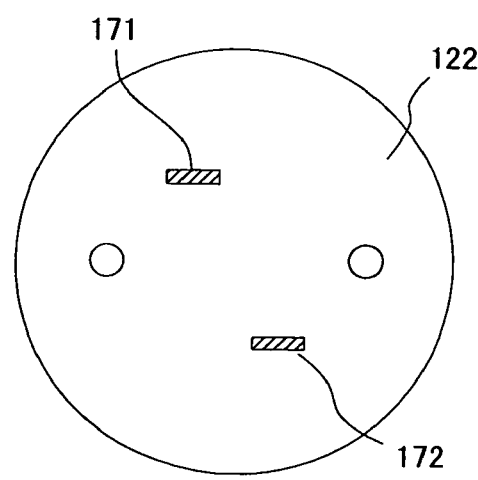
FIG. 12(a) shows a front view of a first lid pertaining to the third embodiment of the invention.
FIG. 12(b) shows a front view of a second lid pertaining to the third embodiment of the invention.
Figure 12:
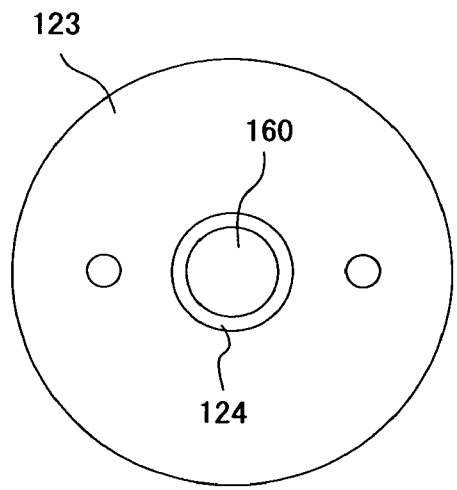
Figure 13:
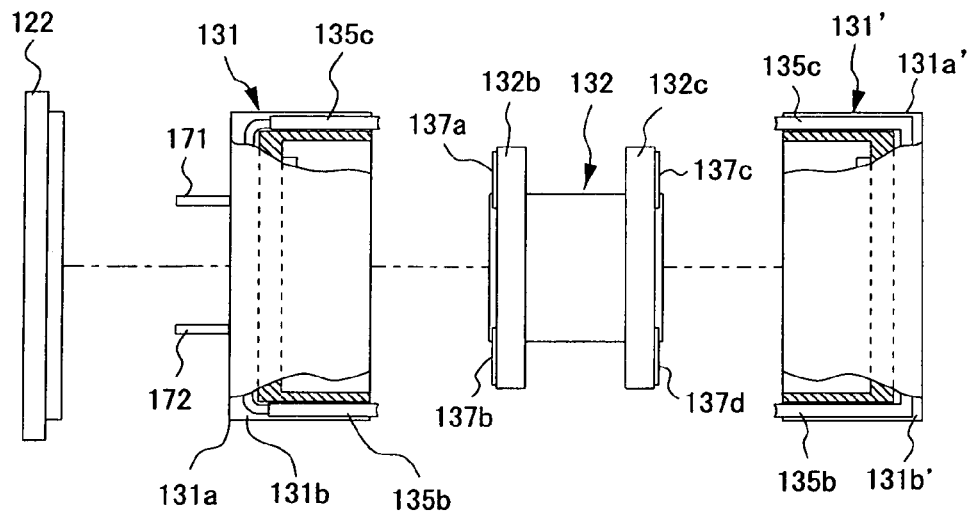
FIG. 13 is an exploded profile of the first lid, wiring members for the electrodes and the slide member pertaining to the third embodiment of the invention.
Figure 14:
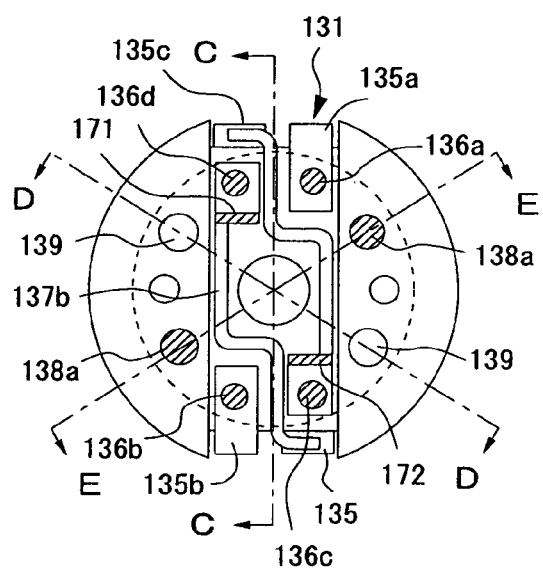
FIG. 14(a) shows the front surface of the wiring member for the first electrode pertaining to the third embodiment of the invention.
FIG. 14(b) shows the rear surface of the wiring member for the first electrode pertaining to the third embodiment of the invention.
Figure 14:
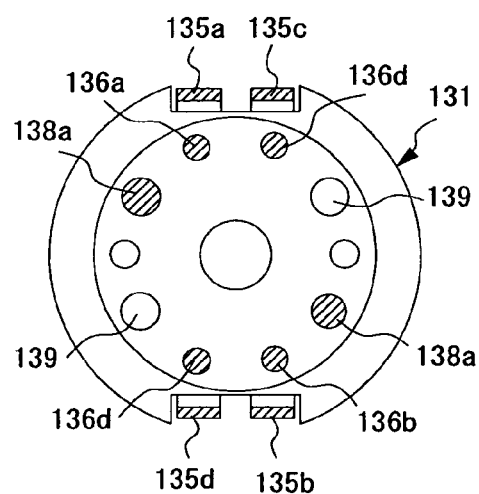

On the outer faces of the first electrode wiring member 131 and the second electrode wiring member 131', electrode arranging grooves 131*b* and 131*b'* are cut as shown in FIG. 11(*a*), FIG. 12, FIGS. 14(*a*) and 14(*b*), and FIGS. 16(*a*) and 16(*b*). On the disk face side of the electrode arranging groove 131*b* of the first electrode wiring member 131, as shown in FIG. 14(*a*), the positive-negative pair of lead terminals 171 and 172 connected to a direct current source 170 are formed. Also, as shown in FIG. 16(*b*), lead wires 134*a* and 134*b* for connection to the exciting coils 141 are connected to the disk face side of the electrode arranging groove 131*b'* of the second electrode wiring member 131'.

Four power supply plates 135*a*, 135*b*, 135*c* and 135*d* for connecting the electrode wiring members 131 and 131' to each other are arranged in the electrode arranging grooves 131*b* and 131*b'* of the electrode wiring members 131 and 131'. One end of the first power supply plate 135*a* is connected to the first electrode wiring member 131 via an electroconductive rivet 136*a*, and the other end is connected to the second electrode wiring member 131' via an electroconductive rivet 136*a'*. One end of the second power supply plate 135*b* is linked to the first electrode wiring member 131 via an electroconductive rivet 136*b*, and the other end is connected to the second electrode wiring member 131' via an electroconductive rivet 136*b'*. One end of the third power supply plate 135*c* is connected to the lead terminal 172 via a lead wire 137*a*, and the lead terminal 172 is provided on the first electrode wiring member 131 via an electroconductive rivet 136*c*. The other end of the third power supply plate 135*c* is provided on the second electrode wiring member 131' via an electroconductive rivet 136*c'*. One end of the fourth power supply plate 135*d* is connected to the lead terminal 171 via a lead wire 137*b*, and the lead terminal 171 is provided on the first electrode wiring member 131 via an electroconductive rivet 136*d*. The other end of the fourth power supply plate 135*d* is provided on the second electrode wiring member 131' via an electroconductive rivet 136*d'*. In the electrode wiring members 131 and 131' configured as described above, the electroconductive rivets 136*a*-136*d* and 136*a'*-136*d'* penetrate the walls of the electrode wiring members 131 and 131', respectively, and the ends of the electroconductive rivets 136*a*-136*d* and 136*a'*-136*d'* protrude into the electrode wiring members 131 and 131'. Further, two attraction rivets 138*a* and 138*a'* formed of magnetic material are embedded in the electrode wiring members 131 and 131'.

The slide member 132 is formed in a cylindrical shape as shown in FIG. 11 and FIG. 12, and the slide member 132 has at its center a through hole 132*a* to let the shaft 160 penetrate. The bore of the through hole 132*a* at the ends in the axial direction are large enough to let the shaft 160 pass with a safe margin and smaller than the diameter of the change-over engaging member 133. Thus the shaft 160, while freely shifting within the through hole 132*a* in the axial direction, is prevented from going out of the through hole 132*a* by the engagement of an engaging ring 133*a*, to be described afterwards, of the change-over engaging member 133 with the both ends of the through hole 132*a*. Flanges 132*b* and 132*c* extending in the outward direction are formed at both ends of the slide member 132 in the axial direction.

Change-over electrode plates 137*a*, 137*b*, 137*c* and 137*d* are fitted for the surfaces of the flanges 132*b* and 132*c* as shown in FIGS. 15(*a*) and 15(*b*). The surface of the flange 132*b* opposite the first electrode wiring member 131 has two change-over electrode plates 137*a* and 137*b*, opposing each other in the radial direction. One of the change-over electrode plates, 137*a*, is opposite the electroconductive rivets 136*a* and 136*d* (anode side) fixed to the first electrode wiring member 131. The other change-over electrode plate 137*b* is opposite the electroconductive rivets 136*b* and 136*c* (cathode side) fixed to the first electrode wiring member 131. The surface of the flange 132*c* opposite the second electrode wiring member 131' has two change-over electrode plates 137*c* and 137*d*, opposing each other in the radial direction. One of the change-over electrode plates, 137*c*, is opposite the electroconductive rivets 136*a'* and 136*c'* fixed to the second electrode wiring member 131'. The other change-over electrode plat 137*d* is opposite the electroconductive rivets 136*b'* and 136*d'* fixed to the second electrode wiring member 131'.

Figure 18:
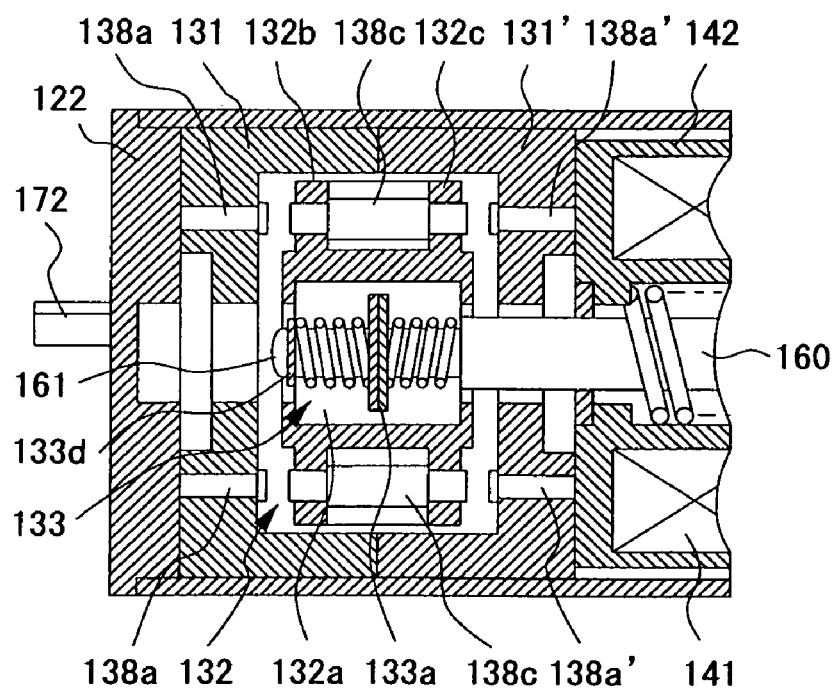
FIG. 18 shows a section of a power supply change-over member cut in the direction of arrow E-E in FIG. 14(a)

The slide member 132 is provided with two rod-shaped attractive magnets 138*c*. The attractive magnets 138*c* are fitted to the flanges 132*b* and 132*c* as shown in FIG. 18, so arranged that the ends of the attractive magnets 138*c* oppose the attraction rivets 138*a* and 138*a'*.

Figure 17:
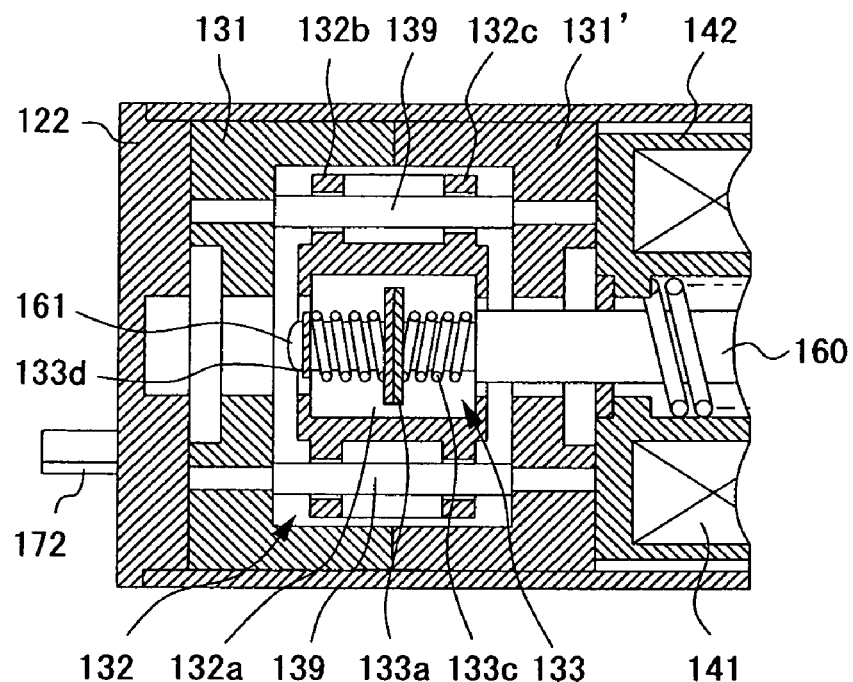
FIG. 17 shows a section of a power supply change-over member cut in the direction of arrow D-D in FIG. 14(a)

Further, two slide pins 139 penetrate the slide member 132. The slide pins 139 penetrate the flanges 132*b* and 132*c* as shown in FIG. 17, and their both ends are firmly stuck to the first and second electrode wiring members 131 and 131'. This arrangement enables the slide member 132 to slide in the axial direction between the electrode wiring members 131 and 131'.

The configuration is such that, in the slide member 132 and the first and second electrode wiring members 131 and 131', the polarity of the direct current supplied to the exciting coils 141 differs between the case in which the slide member 132 shifts toward the first electrode wiring member 131 and the case in which the slide member 132 shifts toward the second electrode wiring member 131'.

Figure 19:
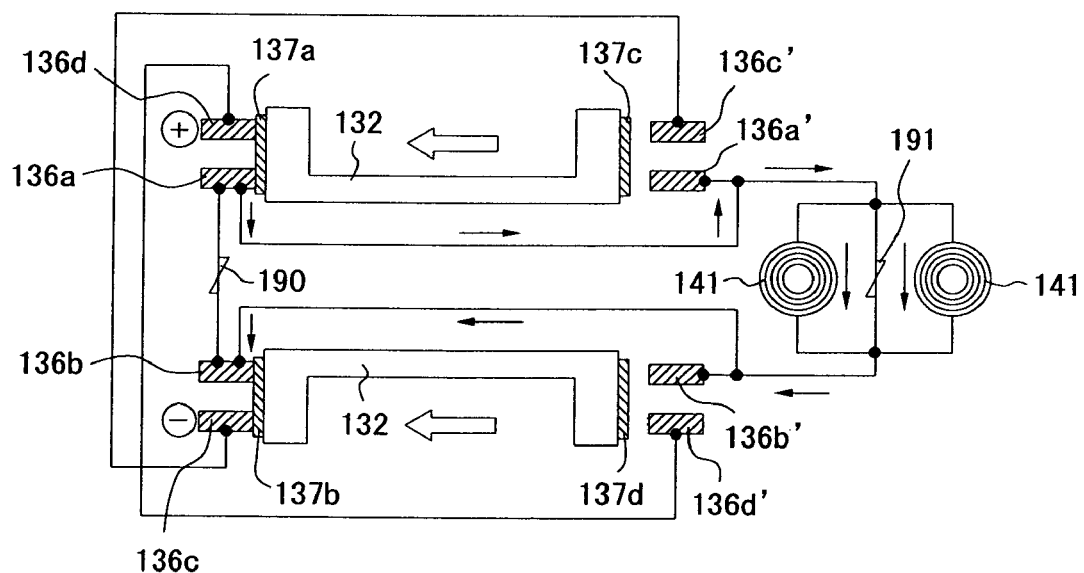
FIG. 19 is a circuit diagram showing the flow of the electric current when the power supply electrode of the wiring member for the first electrode and one of the change-over electrodes of the slide member are connected.

This polarity conversion will now be described with reference to FIG. 19 and FIG. 20. Here, FIG. 19 shows a state in which the slide member 132 has shifted to the first electrode wiring member 131. Thus, it is a state in which the attractive magnets 138*c* are attracted by the attraction rivets 138*a*, while on the other hand the attractive magnets 138*c'* have become separated from the attraction rivets 138*a'*. In this state, the change-over electrode plate 137*a* is in contact with the electroconductive rivets 136*a* and 136*d*, and the change-over electrode plate 137*b* is in contact with the electroconductive rivets 136*b* and 136*c*.

This establishes continuity of the lead terminal 171 (anode) to the electroconductive rivet 136*a* through the electroconductive rivet 136*d* and the change-over electrode plate 137*a*, and further to the exciting coils 141 through the first power supply plate 135*a* and the lead wire 134*a*. Also, continuity is established for the lead terminal 172 (cathode) to the electroconductive rivet 136*b* through the electroconductive rivet 136*c* and the change-over electrode plate 137*b*, and further to the exciting coils 141 through the second power supply plate 135*b* and the lead wire 134*b*. When continuity of the lead terminals 171 and 172 to the exciting coils 141 is established in this way, the current flows as indicated by solid arrows in FIG. 19, and the coil units 140 and 140' are excited.

Figure 20:
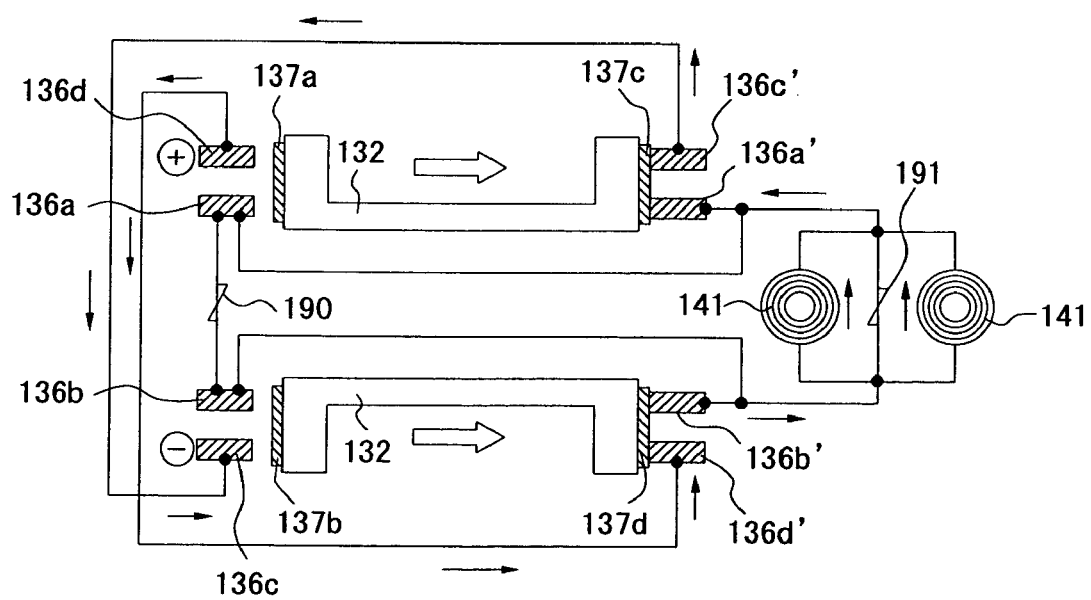
FIG. 20 is a circuit diagram showing the flow of the electric current when the power supply electrode of the wiring member for the second electrode and the other of the change-over electrodes of the slide member are connected.

On the other hand, FIG. 20 shows a state in which the slide member 132 has shifted to the second electrode wiring member 131'. Thus, the attractive magnets 138*c* are attracted by the attraction rivets 138*a'* while on the other hand the attractive magnets 138*c* are separated from the attraction rivets 138*a*. When in this state, the change-over electrode plate 137*c* is in contact with the electroconductive rivets 136*a'* and 136*c'*, and the change-over electrode plate 137*d* is in contact with the electroconductive rivets 136*b'* and 136*d'*.

This establishes continuity of the lead terminal 171 (anode) to the electroconductive rivet 136*d'* through the lead wire 137*b* and the fourth power supply plate 135*d*, and further to the exciting coils 141 through the change-over electrode plate 137*d*, the electroconductive rivet 136*b'*, the second power supply plate 135*b* and the lead wire 134*b*. Also, continuity is established for the lead terminal 172 (cathode) to the electroconductive rivet 136*c'* through the lead wire 137*a* and the third power supply plate 135*c*, and further to the exciting coils 141 through the change-over electrode plate 137*c*, the electroconductive rivet 136*a'*, the first power supply plate 135*a* and the lead wire 134*a*. When continuity of the lead terminals 171 and 172 to the exciting coils 141 is established in this way, the current flows as indicated by solid arrows in FIG. 20, and the coil units 140 and 140' are excited.

Herein, as shown in FIG. 19 and FIG. 20, the flowing directions of the current to the exciting coils 141 are reverse to each other, resulting in reverse polarities supplied to the exciting coils 141. Incidentally, as shown in FIG. 19 and FIG. 20, varistors 190 and 191 are installed within the electric circuit to restrain the impulse voltage and absorb noise.

The change-over engaging member 133, as shown in FIG. 11(*a*), has the engaging ring 133*a* formed of two annular metal plates joined together and return springs 133*b* and 133*c* positioned to the right and left of the engaging ring 133*a*. These members 133*a*, 133*b* and 133*c* penetrate a small bore portion 161 formed at one end of the shaft 160. The return spring 133*b*, positioned on the left side in FIG. 11(*a*), is arranged between a spring stop ring 133*d* and the engaging ring 133*a*, and the return spring 133*c*, positioned on the right side, is arranged between the engaging ring 133*a* and a level gap portion at the right end of the small bore portion 161. Since the outer diameter of the engaging ring 133*a* is greater than the bores on both sides of the through hole 132*a*, the engaging ring 133*a* is prevented from going out of the slide member 132.

Figure 21:
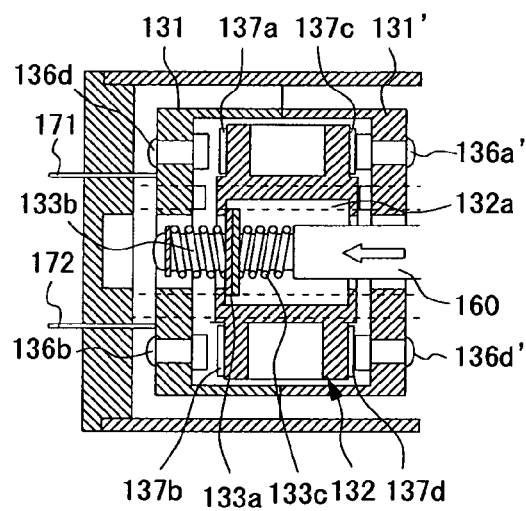
FIG. 21(a) shows the standby state of the slide plate pertaining to the third embodiment of the invention.
FIG. 21(b) is an attraction process diagram showing the state in which the slide plate pertaining to the third embodiment of the invention is attracted to the wiring member for the first electrode.
FIG. 21(c) is an engagement process diagram showing the state in which an engaging ring pertaining to the third embodiment of the invention is engaged with one inner circumferential edge of a through hole.
FIG. 21(d) is a spring contracting process diagram showing the state in which one of returning springs pertaining to the third embodiment of the invention is contracted.
FIG. 21(e) is an engagement process diagram showing the state in which the engaging ring pertaining to the third embodiment of the invention is engaged with the other inner circumferential edge of the through hole.
FIG. 21(f) is a spring contracting process diagram showing the state in which the other of returning springs pertaining to the third embodiment of the invention is contracted.
Figure 21:
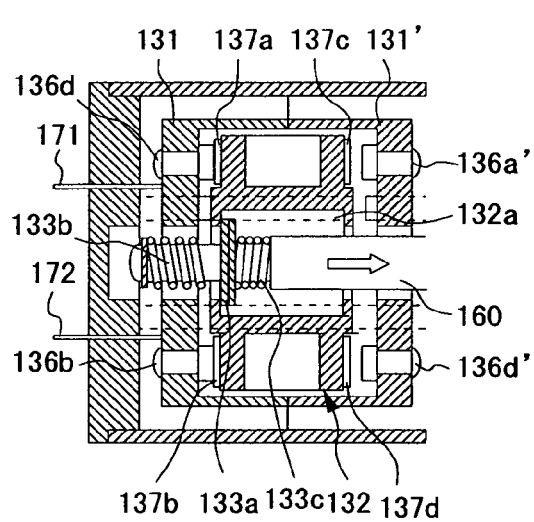

The operations of the electromagnetic driver 100 of this embodiment will be described with reference to FIGS. 21(*a*)-(*f*). FIG. 21(*a*) shows a standby state. When the electromagnetic driver 100 is in the standby state, the slide member 132 is positioned at the center between the first electrode wiring member 131 and the second electrode wiring member 131', and the change-over electrode plates 137*a*-137*d* are separated from the electroconductive rivets 136*a*-136*d* and 136*a'*-136*d'*.

However, the slide plate 132 usually is not supposed to be positioned at the center between the electrode wiring boards 131 and 131'. Therefore, the attractive magnet 138*c* is attracted by the attraction rivet 138*a*, or the attractive magnet 138*c* is attracted by the attraction rivet 138*a'*. Now, if the attractive magnet 138*c* is attracted by the attraction rivet 138*a* (namely the slide plate 132 is attracted by the first electrode wiring member 131), the change-over electrode plate 137*a* is in contact with the attraction rivets 136*a* and 136*d*, and the change-over electrode plate 137*b* is in contact with the attraction rivets 136*c* and 136*b* (see FIG. 19). On the other hand, if the attractive magnet 138*c* is attracted by the attraction rivet 138*a'* (namely the slide plate 132 is attracted by the second electrode wiring member 131'), the change-over electrode plate 137*c* is in contact with the attraction rivets 136*a'* and 136*c'*, and the change-over electrode plate 137*d* is in contact with the attraction rivets 136*b'* and 136*d'* (see FIG. 20). Incidentally, FIG. 21(*b*) shows a state in which the slide plate 132 is attracted by the first electrode wiring member 131.

When power is supplied from the direct current source 170 to the lead terminals 171 and 172, as described above a direct current flows as shown in FIG. 19 to the exciting coils 141, and the coil units 140 and 140' are excited. This causes a repulsive magnetic field to be formed between the first coil unit 140 and the first magnet unit 150 and to form an attractive magnetic field to be formed between the second coil unit 140' and the second magnet unit 150'. As a result, a rightward shifting force is provided to the shaft 160 as indicated by the arrow in white in FIG. 21(*b*).

The shifting force (rightward) provided to the shaft 160 causes the shaft 160 to shift rightward as shown in FIG. 21(*c*), and the engaging ring 133*a* engages with one inner circumferential edge of the through hole 132*a*. As the shaft 160 continues to be provided with the shifting force while this engaging ring 133*a* remains in engagement, the return spring 133*b* is contracted as shown in FIG. 21(*d*). The repulsive force of the return spring 133*b* works to move the attractive magnet 138*c* away from the attraction rivet 138*a*. As a result, as shown in FIG. 21(*d*), the slide member 132 shifts rightward to have the attractive magnet 138*c'* and the attraction rivet 138*a'* attract each other. This causes a current to flow to the exciting coils 141 in the reverse direction to have an attractive magnetic field formed between the first coil unit 140 and the first magnet unit 150 and at the same time to have a repulsive magnetic field formed between the second coil unit 140' and the second magnet unit 150'. As a result, a leftward shifting force is provided to the shaft 160 as indicated by the arrow in white in FIG. 21(*d*).

The shifting force (leftward) provided to the shaft 160 causes the shaft 160 to shift leftward as shown in FIG. 21(*e*), and the engaging ring 133*a* engages with the other inner circumferential edge of the through hole 132*a*. As the shaft 160 continues to be provided with the shifting force while this engaging ring 133*a* remains in engagement, the return spring 133*c* is contracted as shown in FIG. 21(*f*). The repulsive force of the return spring 133*c* works to move the attractive magnet 138*c'* away from the attraction rivet 138*a'*. As a result, as shown in FIG. 21(*e*), the slide member 132 moves leftward, to have the attractive magnet 138*c* and the attraction rivet 138*a* attract each other. This causes a current to flow to the exciting coils 141 in the original direction to have a repulsive magnetic field formed between the first coil unit 140 and the first magnet unit 150 and at the same time to have an attractive magnetic field formed between the second coil unit 140' and the second magnet unit 150'. As a result, a rightward shifting force is provided to the shaft 160 as indicated by the arrow in white in FIG. 21(*f*). After that, the state shown in FIG. 21(*b*) is resumed.

In this embodiment of the invention, as the polarity is alternately changed when a direct current is supplied to the exciting coils 141 of the electromagnetic units 100*a* and 100*b*, the shaft 160 reciprocates in the axial direction.

Figure 22:
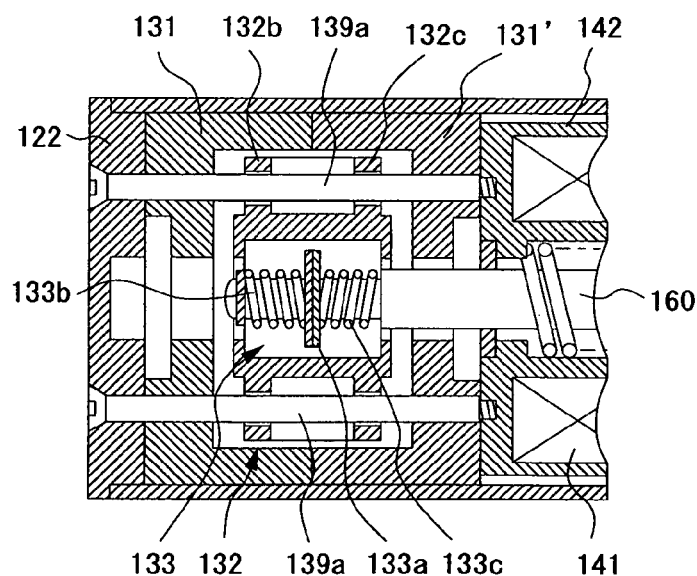
FIG. 22 shows a section of a modification of a slide pin pertaining to the third embodiment of the invention.

FIG. 22 shows another electromagnetic driver, which is a fourth preferred embodiment of the invention. Incidentally, the same constituent elements as in the third embodiment are designated by respectively the same reference signs, and their description is dispensed with.

In the foregoing third embodiment, the first and second electrode wiring members 131 and 131' and the slide member 132 are provided with the slide pins 139, slide pins 139*a* are so structured as to fix the lid 122 as well as the first and second electrode wiring members 131 and 131' and the slide member 132.

This embodiment, as the slide pins 139*a* are also used for fixing the lid 122, requires a smaller number of components. Other configurational features and effects are similar to those of the foregoing third embodiment.

Figure 23:
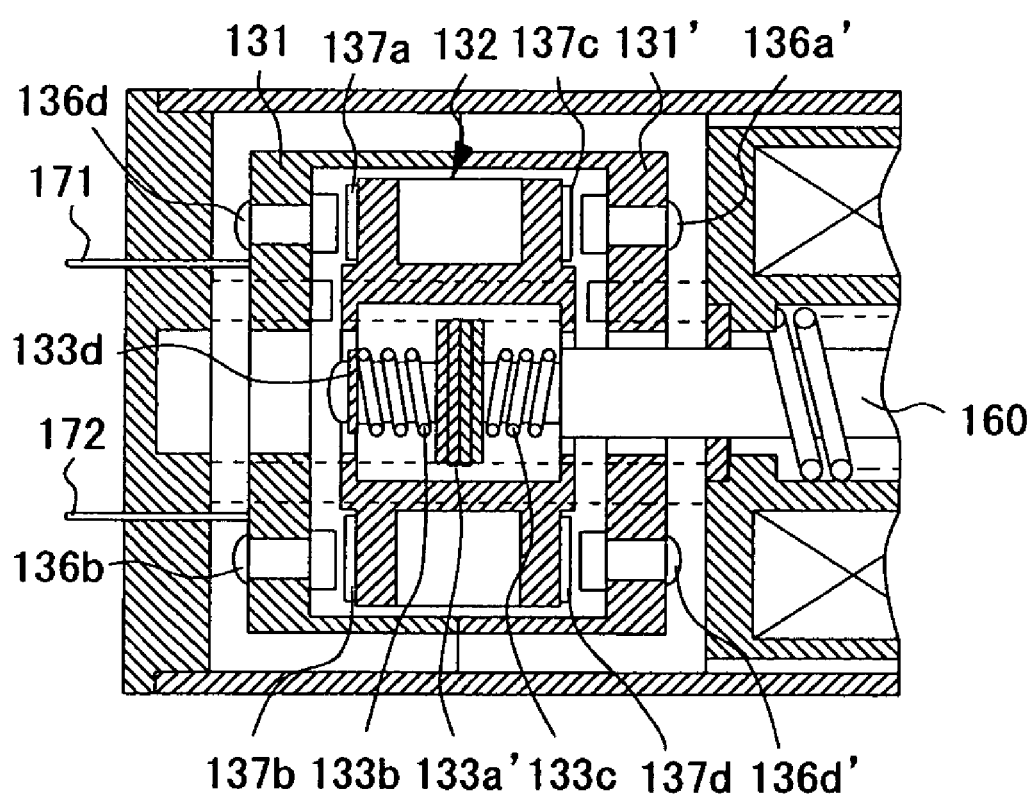
FIG. 23 shows a section of an example in which the engaging ring pertaining to the third embodiment of the invention is composed of four metal plates.

FIG. 23 shows another electromagnetic driver, which is a fifth preferred embodiment of the invention. The same constituent elements as in the third embodiment are designated by respectively the same reference signs, and their description is dispensed with.

While the foregoing third embodiment uses the engaging ring 133a formed of two metal plates joined together, this embodiment uses an engaging ring 133a' formed of four metal plates joined together. By increasing the number of metal plates used, the distance between the engaging ring 133a' and the two sides of the through hole 132a (the areas where the engaging ring 133a' is engaged) is shortened. As a result, the polarity can be changed over more quickly, and the number of reciprocal travels of the shaft 160 per unit length of time is increased. In this way, by altering the number of metal plates constituting the engaging ring 133a', the number of reciprocal travels of the shaft 160 can be varied.

While the electromagnetic driver according to the present invention has been described so far, any device which utilizes the reciprocation of the shaft 60 or 160 can be used according to the invention in many different devices including an air pump, a compressor, an electric lock, a medical apparatus such as a massaging machine, a precisely oscillating machining device such as a drill, or a bodily sensed vibration device.

The invention claimed is:

1. An electromagnetic driver, comprising:
   two electromagnetic units each having a coil unit which induces in one direction magnetic fluxes formed by supplying a direct current to an exciting coil with a yoke core and a magnet unit in which a permanent magnet is so arranged as to interfere with the magnetic field of the coil unit, wherein either the coil unit or the magnet unit is made movable by the supply of the direct current to the exciting coil;
   a shaft which is capable of reciprocating in the axial direction, having the electromagnetic units arranged in the axial direction, and is firmly stuck to the movable coil unit or the magnet unit; and
   a power supply change-over device which, when a direct current is supplied to the exciting coil, is capable of so changing over alternately the current polarity of the exciting coil that, when an attractive magnetic field is formed between the coil unit and the magnet unit of one of the electromagnetic units, a repulsive magnetic field is formed between the coil unit and the magnet unit of the other of the electromagnetic units and, when an attractive magnetic field is formed between the coil unit and the magnet unit of the other of the electromagnetic units, a repulsive magnetic field is formed between the coil unit and the magnet unit of the one of the electromagnetic units.

2. The electromagnetic driver according to claim 1, wherein:
   the power supply change-over device has:
   a first electrode wiring member having a positive-negative pair of first power supply electrodes connected to a direct current source;
   a second electrode wiring member having a positive-negative pair of second power supply electrodes, arranged at spacing from the first electrode wiring member in the axial direction of the shaft and connected to the direct current source in a different polarity from the polarity of the first power supply electrodes;
   a slide member arranged between the electrode wiring members and shiftable in the axial direction of the shaft;
   change-over electrodes provided on those sides of the slide member that are opposite the power supply electrodes and capable of electrically connecting the power supply electrodes and the exciting coil;
   magnet attractive members which cause the slide member to be selectively attracted by the first electrode wiring member and the second electrode wiring member; and
   two change-over engaging members which, fixed to the shaft with the slide member in-between, cause the slide member to shift toward the first electrode wiring member by engaging with one area of the slide member by the shifting of the shaft in one axial direction, and cause the slide member to shift toward the second electrode wiring member by engaging with the other area of the shaft in the other axial direction.

3. The electromagnetic driver according to claim 1, wherein:
   the power supply change-over device has:
   a first electrode wiring member having a positive-negative pair of first power supply electrodes connected to a direct current source;
   a second electrode wiring member arranged at spacing from the first electrode wiring member in the axial direction of the shaft and having second power supply electrodes connected to the first power supply electrodes;
   a slide member arranged between the electrode wiring members at spacing from the electrode wiring members and shiftable in the axial direction of the shaft;
   change-over electrodes provided on those sides of the slide member that are opposite the power supply electrodes and let a current flow in a polarity that is reversed between connection to the first power supply electrodes and connection to the second power supply electrodes;
   magnet attractive members which cause the slide member to be selectively attracted by the first electrode wiring member and the second electrode wiring member; and
   change-over engaging members which, held by the shaft, cause the slide member to shift toward the first electrode wiring member by engaging with one area of the slide member by the shifting of the shaft in one axial direction, and cause the slide member to shift toward the second electrode wiring member by engaging with the other area of the shaft in the other axial direction.

4. The electromagnetic driver according to claim 1, wherein:
   the power supply change-over device has:
   a first electrode wiring member having a positive-negative pair of first power supply electrodes connected to a direct current source;
   a second electrode wiring member arranged at spacing from the first electrode wiring member in the axial direction of the shaft and connected to the direct current source in a different polarity from the polarity of the first power supply electrodes;
   a detectable member embedded in the shaft;
   a detection sensor which detects the position of the detectable member; and
   a control device which selectively changes over power supply to the power supply electrodes in accordance with a detection signal from the detection sensor.

5. The electromagnetic driver according to claim 2, wherein:
the change-over engaging members are formed of shock absorbing material.

6. The electromagnetic driver according to claim 3, wherein:
the change-over engaging members are arranged between one area and the other area of the slide member, and comprise an engaging ring through which the shaft shiftably penetrates and spring members which press the engaging ring from various sides to hold the engaging ring in a prescribed position.

7. The electromagnetic driver according to claim 6, wherein:
the engaging ring is formed by stacking two or more plates one over another.

8. The electromagnetic driver according to claim 2, further having:
a plurality of slide pins shiftably supporting the slide member, wherein the slide pins are formed of electro-conductive material connected to the power supply electrodes of the first and second electrode wiring members.

9. The electromagnetic driver according to claim 3, further having:
a plurality of slide pins shiftably supporting the slide member, wherein the first and second electrode wiring members are integrally fixed by the slide pins.

* * * * *